United States Patent
Shoji et al.

(10) Patent No.: US 8,531,713 B2
(45) Date of Patent: Sep. 10, 2013

(54) IMAGE FORMING APPARATUS FOR SEQUENTIALLY DISPLAYING THE DISPLAY IMAGES IN THE INPUT ORDER AND DISPLAYING THE LATEST DISPLAY IMAGE DURING INPUT OF THE IMAGE DATA

(75) Inventors: Toshihiro Shoji, Osaka (JP); Mikiya Okada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 126 days.

(21) Appl. No.: 13/227,887

(22) Filed: Sep. 8, 2011

(65) Prior Publication Data
US 2012/0069393 A1 Mar. 22, 2012

(30) Foreign Application Priority Data
Sep. 22, 2010 (JP) ................. 2010-212410

(51) Int. Cl.
*G06F 3/12* (2006.01)
(52) U.S. Cl.
USPC ........................ 358/1.15; 358/471; 715/274
(58) Field of Classification Search
USPC .............................................. 715/471
See application file for complete search history.

(56) References Cited

U.S. PATENT DOCUMENTS

| | | | |
|---|---|---|---|
| 6,532,077 B1 | 3/2003 | Arakawa | |
| 2003/0099004 A1* | 5/2003 | Chiu | 358/485 |
| 2005/0190415 A1* | 9/2005 | Ueda | 358/505 |
| 2007/0076251 A1 | 4/2007 | Yasuda | |
| 2007/0195386 A1 | 8/2007 | Shinohara et al. | |
| 2008/0002237 A1* | 1/2008 | Matsunaga | 358/471 |
| 2008/0030818 A1* | 2/2008 | Nagahara et al. | 358/537 |
| 2009/0009815 A1* | 1/2009 | Karasik et al. | 358/403 |
| 2009/0185053 A1 | 7/2009 | Ejima et al. | |

FOREIGN PATENT DOCUMENTS

| | | |
|---|---|---|
| JP | 09-102853 A | 4/1997 |
| JP | 2003-125125 A | 4/2003 |
| JP | 2006-211002 A | 8/2006 |
| JP | 2006-260029 A | 9/2006 |
| JP | 2007-037066 A | 2/2007 |
| JP | 2007-097052 A | 4/2007 |
| JP | 2007-221729 A | 8/2007 |
| JP | 2007-288654 A | 11/2007 |
| JP | 2010-056904 A | 3/2010 |
| JP | 2010-171780 A | 8/2010 |

* cited by examiner

*Primary Examiner* — Qian Yang
(74) *Attorney, Agent, or Firm* — Edwards Wildman Palmer LLP; David G. Conlin; David A. Tucker

(57) ABSTRACT

An image forming apparatus includes a document reader, a storage for storing image data and a control unit. The control unit includes a display image generator, a display panel and a control unit-side controller for giving display guidance on the input status of image data from the document reader, on the display panel. The control unit-side controller has the function that, when image data is input from the document reader, displays display images generated by the display image generator, sequentially in the order of input and displaying the latest display image preferentially in the preview region during input of image data.

5 Claims, 16 Drawing Sheets

IMAGE FORMING APPARATUS FOR SEQUENTIALLY DISPLAYING THE DISPLAY IMAGES IN THE INPUT ORDER AND DISPLAYING THE LATEST DISPLAY IMAGE DURING INPUT OF THE IMAGE DATA

This Nonprovisional application claims priority under 35 U.S.C. §119 (a) on Patent Application No. 2010-212410 filed in Japan on 22 Sep. 2010, the entire contents of which are hereby incorporated by reference.

BACKGROUND OF THE INVENTION (1) Field of the Invention

The present invention relates to an image forming apparatus such as a copier, printer, facsimile machine or the like, in particular, relating to an image forming apparatus equipped with an image display control device capable of displaying input document images in preview representation.

(2) Description of the Prior Art

Recently, there have been known image forming apparatus that include an image display control device capable of input document images in a preview representation. In such image forming apparatus, it is possible for the user to confirm the documents that have been scanned before printout by displaying the processed result of the scanned (pre-scanned) documents before execution of a job.

As a prior art example, there has been disclosed a configuration of an image forming apparatus including a display processing means that displays setting items for image processing and preview information showing the scheme of the image processing result on the same screen of a display means, so as to display preview information on the display means (see Patent Document 1).

According to the above image forming apparatus, when the pre-scan button is selected, a document is scanned (pre-scanned) in advance before the start of the job so that the preview of the processed result can be confirmed on the screen. On the other hand, when the cancel button is selected, the pre-scanning is canceled and the display mode returns to the original state. When the OK button is selected, the display mode transits to a job execution state that displays a preview image using the pre-scanned document image. In this case, the pre-scanned image is stored in RAM (Random Access Memory) or the like, and the stored information is handed over to the next screen. When multiple pages of documents have been scanned, arrow buttons are used to check the preview images of pages before and behind.

As another example of technology, there has been disclosed a configuration of an image processing apparatus including an animation display means that displays functions such as reading, reception, transmission and printing of images, by animation, so as to display the current function being executed by the image processed apparatus, in an animation representation (see Patent Document 2).

According to the above image processing apparatus, it is determined whether a pre-scanning copy (pre-scan operation) is in progress, and if it is determined that pre-scanning is being implemented, an animated picture is displayed on a UI device (user interface device). That is, an animated picture is displayed on a UI device having an animation display screen. This animated picture represents the image processing apparatus itself. Specifically, the animation presents an action in which document objects representing documents are taken into an apparatus object, and the images change in such a manner that document objects successively enter the scanning unit of the apparatus object, and the display of the animated picture is repeated during pre-scanning.

In this way, it is possible for the user to readily confirm the processing status of the image processing apparatus by displaying the function in progress in the image processing apparatus, in an animation representation.

Patent Document 1:
Japanese Patent Application Laid-open 2007-221729
Patent Document 2:
Japanese Patent Application Laid-open 2003-125125

However, the technology described in Patent Document 1 entails the problem that the user cannot grasp the status during scanning since no display of the progress of scanning is given when documents are pre-scanned.

On the other hand, the technology described in Patent Document 2 can inform the user of the function that is being executed in the image processing apparatus, but no display of the progress of scanning when documents are pre-scanned are displayed, similarly to the technology in Patent Document 1. Accordingly, the user cannot grasp the status during scanning, it hence is difficult to improve operativity.

SUMMARY OF THE INVENTION

The present invention has been devised in view of the above prior art problems, it is therefore an object of the present invention to provide an image forming apparatus that is improved in operativity by enabling the user to visually check the progress of scanning on a display screen when documents are pre-scanned.

The first aspect of the invention resides in an image forming apparatus comprising:

an input unit receiving input of image data;

a storing unit storing the image data input to the input unit and, an image display control device, the image display control device, including:

a display image generator generating a display image based on the image data stored in the storing unit;

a display portion having a preview region for displaying the display image generated by the display image generator; and, a display controller for giving guidance on the input status of the image data input to the input unit, on the display portion, and is characterized in that when the image data is input to the input unit, the display controller provides the function of sequentially displaying the display images generated by the display image generator in the input order and displaying the latest display image among the display images based on the image data, preferentially in the preview region, during input of the image data.

The second aspect of the present invention resides in that the display controller has the function of displaying the precedent display image generated precedently among the display images in the preview region, erasing the precedent display image from the preview region and then displaying the latest display image generated based on the latest image data, in the preview region.

The third aspect of the present invention resides in that the display controller has the function of displaying the precedent display image generated precedently among the display images in the preview region, starting erasure of the precedent display image from the preview region and then displaying the latest display image generated based on the latest image data, in the preview region.

The fourth aspect of the present invention resides in that the display controller has the function of gradually erasing the precedent display image when the image is erased from the preview region.

Here, the display controller may be designed to perform such control that the display image is gradually reduced from a large size to a small size and then erased, that the display image is gradually reduced in image density from normal to thin and erased, that the display image is gradually reduced in clearness from normal to blurred and erased or that the displayed area of the display image is gradually reduced from the normally displayed state to the less displayed state.

The fifth aspect of the present invention resides in that the controller has the function that, when display of a plurality of the display images in the preview region has been completed, displays the front page display image generated first among the display images, in the preview region.

The sixth aspect of the present invention resides in that the controller has the function that, when display of a plurality of the display images in the preview region has been completed, enlarges the preview region on the display portion to thereby switch the display mode from the first display mode in which the display images are displayed one by one to the second display mode in which a plurality of the display images are displayed in the order input to the input unit.

The seventh aspect of the present invention resides in that the display portion includes an information display region (e.g., action panel region) in which information including hint, advice and suggestion for operation of the image forming apparatus is displayed, and the display controller has the function that, when display of a plurality of the display images in the preview region has been completed, enlarges the preview region by reducing the information display region to the size enabling the image in the information display region to recover.

The eighth aspect of the present invention resides in that the display portion includes a control portion (e.g., function selecting region) that enables control of setting the image forming functions for the display images displayed in the preview region, and the display controller has the function of enlarging the preview region without reducing the control portion.

The ninth aspect of the present invention resides in that the display portion includes a control key display region (e.g., task trigger region including controls keys, or so-called task trigger keys such as scan-in key, monochrome start key, color start key, clear-all key, etc.) associated with the operation of the apparatus, and the display controller has the function of enlarging the preview region without reducing the control key display region.

According to the first aspect of the present invention, since the latest input data is always displayed in the preview region when image data is input to the image forming apparatus, it is possible for the user to readily confirm the status of the image data being captured into the apparatus.

According to the second aspect of the present invention, since the latest input data alone is displayed in the preview region, it is possible for the user to confirm the latest input data with more ease.

According to the third aspect of the present invention, it is possible for the user to readily confirm that image data is continuously captured into the apparatus and the latest input data is successively displayed.

According to the fourth aspect of the present invention, for example, erasing the display image by gradually reducing from a large size to a small size, erasing the display image by gradually reducing its image density from normal to thin, erasing the display image by gradually reducing its clearness from normal to blurred, or erasing the display by gradually reducing the displayed area of the display image from normally displayed to less displayed, makes it possible to, prevent the image being displayed from being erased all at once, and also imply the coming of the next image to be displayed. Accordingly, the user can readily confirm the input status without feeling anxiety about how the image that had been displayed was handled and other worries.

According to the fifth aspect of the present invention, it is possible to clearly show the user the status in which image data has been completed input.

According to the sixth aspect of the present invention, since the user can view not a single display image but confirm a multiple number of display images of image data that were input to the image forming apparatus at the same time, the user can readily grasp the sequential relationship between images.

According to the seventh aspect of the present invention, since the preview region can be enlarged, it is possible to display not a single display image, but a multiple number of image data that were input to the image forming apparatus, at the same time, the user can readily confirm the images.

Here, by making the information display region in a re-displayable manner, when information including hint, advice and suggestion for operating the image forming apparatus is required, control portion enables the user to make prompt control by displaying the information region, thus it's possible to improve user operatively.

According to the eighth aspect of the present invention, since keeping the display of the control portion enables the user to make prompt control when the user wants to change settings or give any other control instructions, it is possible to improve user operativity.

According to the ninth aspect of the present invention, since the user can give directions at any time when the user want to give some control instructions, it is possible to improve user operativity.

DESCRIPTION OF THE PREFERRED EMBODIMENTS

The embodiment of the present invention will hereinafter be described with reference to the accompanying drawings.

Figure 1:
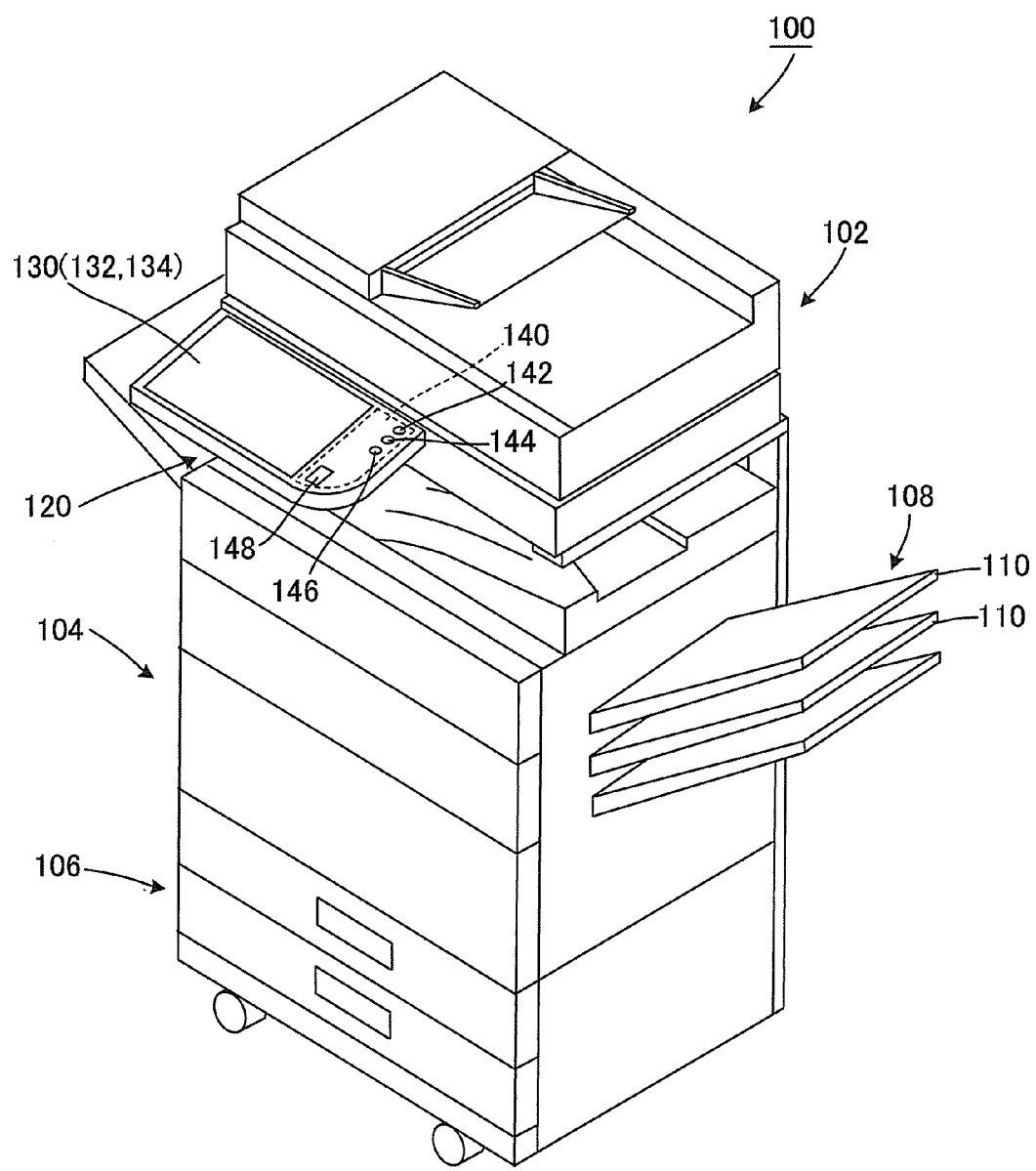
FIG. 1 is an illustrative view showing an overall configuration of an image forming apparatus according to the embodiment of the present invention.
Figure 2:
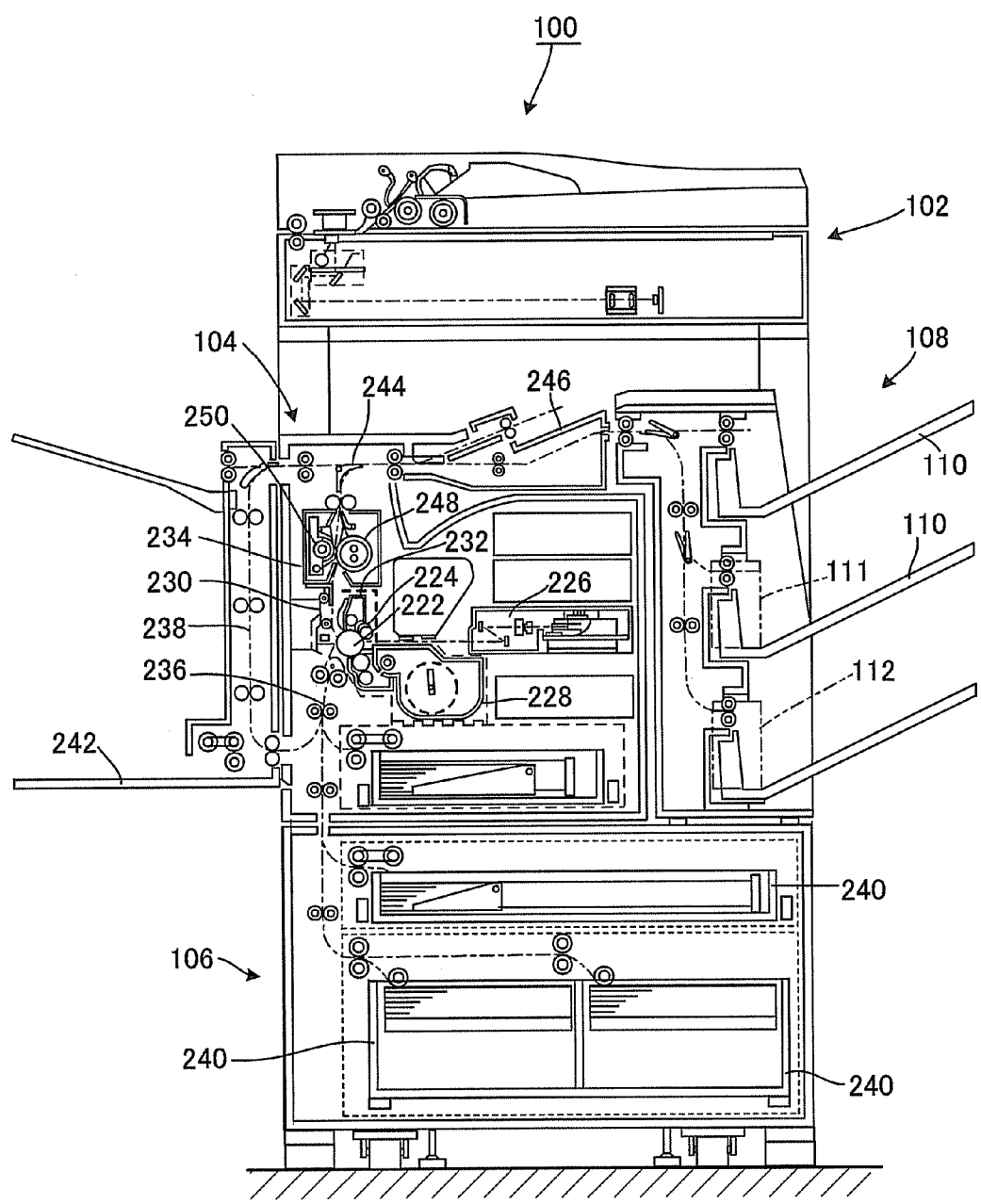
FIG. 2 is an illustrative view schematically showing the internal mechanisms of the image forming apparatus.
Figure 3:
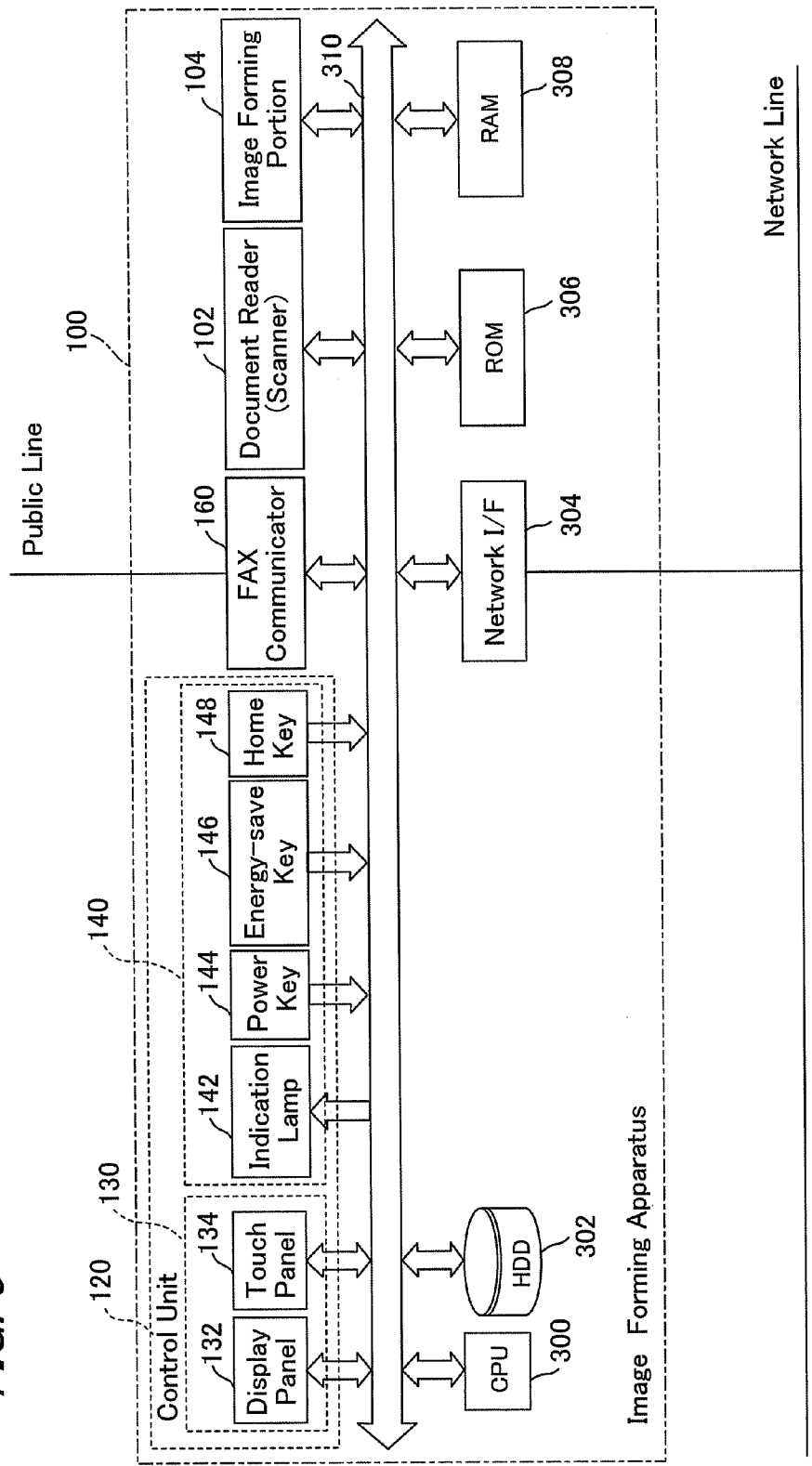
FIG. 3 is a functional block diagram showing a hardware configuration of the image forming apparatus.
Figure 4:
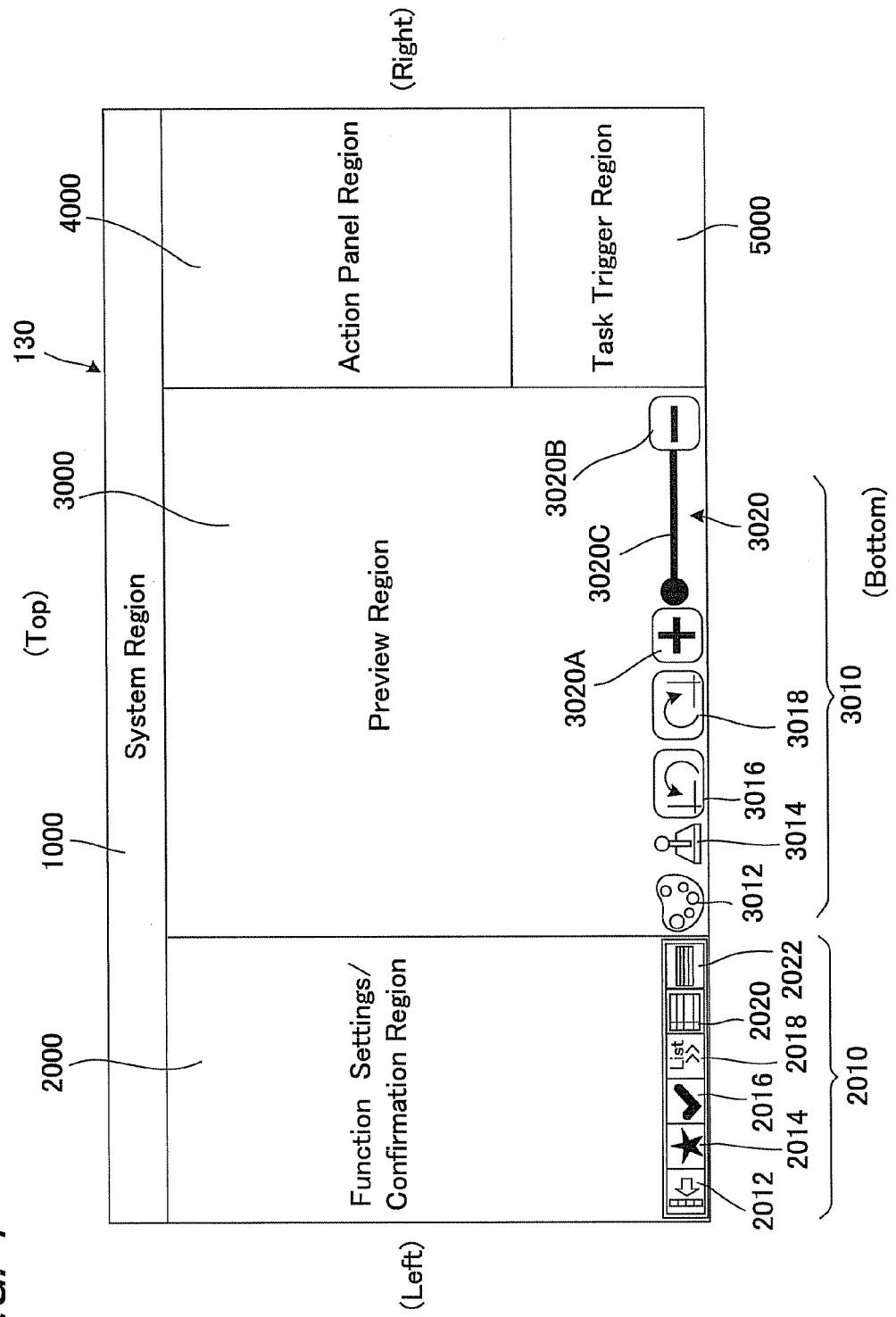
FIG. 4 is an illustrative view showing display regions on a touch panel display of the image forming apparatus.
Figure 5:
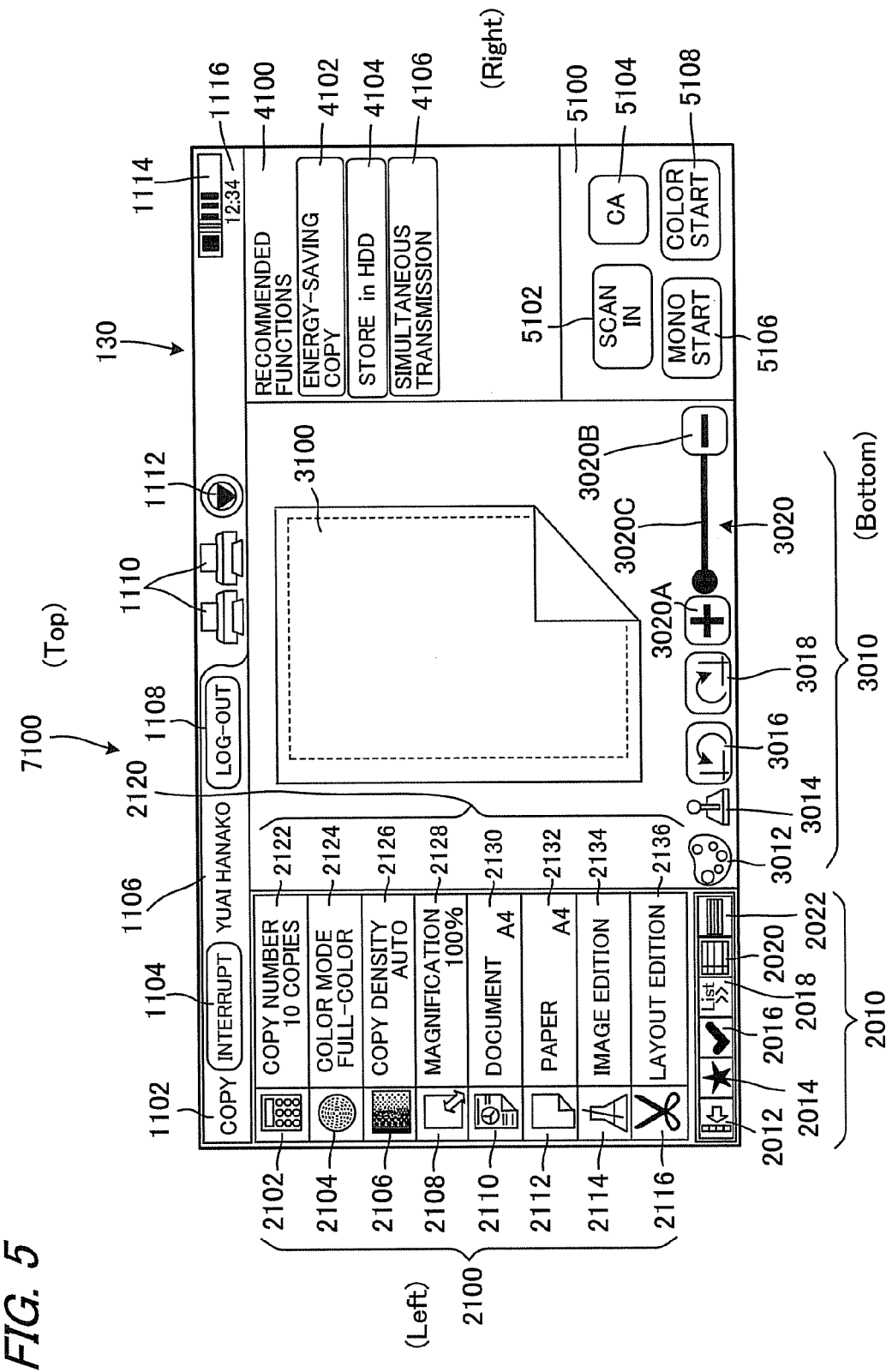
FIG. 5 is an illustrative view showing a screen example displayed on the touch panel display.
Figure 6:
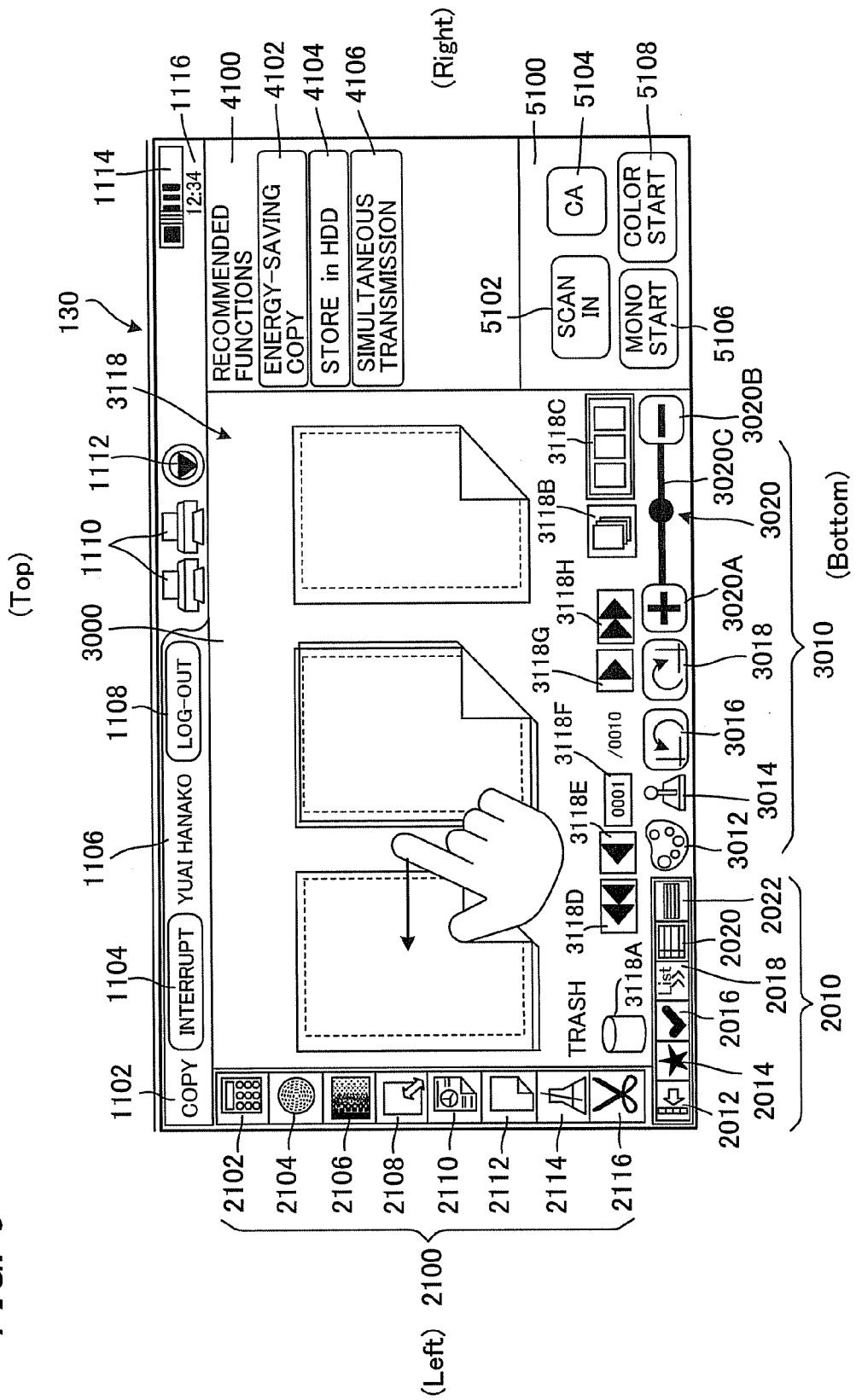
FIG. 6 is an illustrative view showing a state where the preview region being displayed on the touch panel display is changed.

FIG. 1 is an illustrative view of one example mode of carrying out the present invention, showing an overall configuration of an image forming apparatus according to the embodiment of the present invention. FIG. 2 is an illustrative view schematically showing the internal mechanisms of the image forming apparatus. FIG. 3 is a functional block diagram showing a hardware configuration of the image forming apparatus. FIG. 4 is an illustrative view showing a preview display region on a touch panel display of the image forming apparatus. FIG. 5 is an illustrative view showing a screen example displayed on the touch panel display. FIG. 6 is an illustrative view showing a state where the preview region being displayed on the touch panel display is modified.

An image forming apparatus 100 according to the embodiment of the present invention includes, as shown in FIG. 1, includes: a document reader (input unit) 102 for capturing image data; an image forming portion 104 for forming an image on a recording medium based on the image data input through document reader 102; and a control unit (image display control device) 120 having a display panel (display portion) 132 for displaying preview images based on image data and a control unit-side controller (display controller) 131 (see FIG. 9) for displaying the input status of image data input from document reader 102, in a guidance representation on display panel 132.

The multiple document images displayed on display panel 132 may include preview display images of document images captured by the document reader etc., of image forming apparatus 100 and finished preview images of images formed on recording paper by the image forming portion.

Image forming apparatus 100 is a kind of an image processing apparatus. The image display control device according to the present invention is also applicable to image processing apparatus and electronic appliances other than the image forming apparatus of this kind.

Further, image forming apparatus 100 includes a plurality of operational modes, and is equipped with a display device for displaying information for each operational mode. The display device is preferably constructed so as to be able to display information the user wants in a user friendly manner even if the user does not remember the screen configuration when the operational mode is changed over.

Here, image forming apparatus 100 includes a touch panel display (control screen) that can be controlled by both gesture control and touch control other than gesture control, but the image forming apparatus may use a touch panel display that can be controlled by touch control only. Alternatively, the image forming apparatus may include a display panel that cannot be touch-controlled but can display only, with keys for control.

Here, gesture control means controls that are related to various kinds of movements of fingers in combination with GUI (Graphic User Interface), such as responses in accordance with the distance moved and speed of the fingers, double-tapping, the moving fingers trace and the like that are given with meanings.

This image forming apparatus 100 forms images on recording paper based on electrophotography.

Image forming apparatus 100 includes, as its operation modes, copy mode, facsimile mode (FAX mode), document filing mode (a mode in which scanned images are stored in a storage inside the image forming apparatus) and mail mode (a mode in which scanned images are transmitted in the form of an attachment file to an e-mail). This image forming apparatus 100 may further have a network printer mode.

The display screen in image forming apparatus 100 changes every time the operation mode is switched. Further, the printing mechanism is not limited to electrophotography.

To begin with, image forming apparatus 100 will be described.

Image forming apparatus 100 of the present embodiment includes document reader 102, image forming portion 104, a paper feed portion 106, a paper output processor 108 and a control unit 120, as shown in FIG. 1.

Control unit 120 is formed of a touch panel display 130 and a display control portion 140. Touch panel display 130 is comprised of a display panel 132 of a liquid crystal panel or the like and a touch panel (touch control detecting means) 134 that is laid over display panel 132 to detect the positions the user presses with fingers. Display control portion 140 includes an indication lamp 142, a power key 144, an energy-save key 146 and a home key 148 that resets the display content of touch panel display 130 to the home screen for operational mode selection.

In this way, image forming apparatus 100 has touch panel display 130 as a main control device and also has a display control portion 140 that includes the hardware keys and indication lamps. The keys (power key 144, energy-save key 146 and home key 148) on display control portion 140 are given as hardware buttons, in contrast to software buttons formed by touch panel display 130.

Note that image forming apparatus 100 should not be limited to that including display control portion 140 of this kind, but may be provided with touch panel display 130 only. That is, it will work as long as the initial screen of the selected operational mode can be actuated when the user selects an operational mode on the home screen displayed on touch panel display 130. Next, the operational modes of this image forming apparatus 100 will be described.

(Copy Mode)

The operation of the copy mode of image forming apparatus 100 will be described.

In this copy mode, image reader (which will be referred to hereinbelow as "scanner") 102 and image forming portion 104 operate mainly.

A document placed on a document placement table is read as image data by scanner 102 and the read image data is input to a CPU 300 of a microcomputer etc. shown in FIG. 3, where the image data undergoes various kinds of image processing, and the processed image data is output to image forming portion 104.

As shown in FIG. 2, image forming portion 104 is a mechanism that prints images of documents given as image data onto recording mediums (recording paper in most cases), including a photoreceptor drum 222, a charging device 224, a laser scan unit (which will be referred to hereinbelow as "LSU") 226, a developing device 228, a transfer device 230, a cleaning unit 232, a fixing unit 234, an unillustrated charge eraser and other devices.

Also, image forming portion 104 is provided with a main feed path 236 and a reverse feed path 238. The recording paper fed from paper feed portion 106 is conveyed along main feed path 236. Paper feed portion 106 draws recording paper, one sheet at a time, from a stack of recording paper, held in a paper feed cassette 240 or set on a manual feed tray 242 and delivers the recoding paper to main feed path 236 of image forming portion 104.

In the course of the recording paper being conveyed along main feed path 236 of image forming portion 104, the recording paper passes through and between photoreceptor drum 222 and transfer device 230 and then passes through fixing device 234 to perform printing for the recording paper.

While photoreceptor drum 222 rotates in one direction, its surface is cleaned by cleaning device 232 and the charge erasing device, then uniformly electrified by charging device 224.

LSU 226 modulates the laser beam based on the image data to be printed and repeatedly scans the laser beam over the photoreceptor drum 222 surface in the main scan direction, to form an electrostatic latent image on the photoreceptor drum 222 surface.

Developing unit 228 supplies toner to the photoreceptor drum 222 surface and develops the electrostatic latent image to form a toner image on the photoreceptor drum 222 surface.

Transfer device 230 transfers the toner image on the photoreceptor drum 222 surface to the recording paper which passes through the nip between the transfer device 230 and photoreceptor drum 222.

Fixing device 234 includes a heat roller 248 for heating recording paper and a pressing roller 250 for pressing recording paper. The recording paper is heated by heat roller 248 and pressed by pressing roller 250 so that the toner image transferred to the recording paper is fixed to the recording paper. A heater in the heat roller is heated by the power supplied to this fixing unit 234 so as to control and keep heat roller 248 at a temperature suitable for fixing. When the apparatus enters the energy saving mode, for instance the power supplied to this heater is stopped or cut down.

Arranged at the junction between main feed path 236 and reverse feed path 238 is a branch claw 244. When printing is performed on one side of recording paper only, branch claw 244 is positioned so as to lead the recording paper from fixing device 234 toward a paper output tray 246 or paper output processor 108.

When printing is performed on both sides of recording paper, branch claw 244 is rotated in the predetermined direction so that the recording paper is once conveyed toward the paper output tray 246 side. Then, the paper is switched back and conveyed toward reverse feed path 238. The recording paper then passes through reverse feed path 238 and is inverted upside down and fed to main feed path 236 again. The recording paper is once again printed on its rear side in the course of main feed path 236 and lead to paper output tray 246 or paper output processor 108.

The recording paper thus printed is lead to paper output tray 246 or paper output processor 108 and discharged to either paper output tray 246 or each of paper output trays 110 of paper output processor 108.

In paper output processor 108, a plurality of recording sheets are sorted and discharged to individual paper output trays 110, and/or each set of recording sheets is punched or stapled. For example, when multiple copies of printed documents are prepared, the printed recording sheets are sorted and discharged to paper output trays 110 so that one copy of the printed documents is allotted to individual paper output tray 110, and the printed documents on each paper output tray 110 are punched by a punching unit 111 or stapled by a stapling unit 112 to prepare individual printed material.

(Facsimile Mode)

Next, the operation in facsimile mode will be described.

In this facsimile mode, the transmitting operation is mainly effected by document reader (scanner) 102 and a FAX communicator 160, as shown in FIG. 3. The receiving operation is mainly effected by FAX communicator 160 and image forming portion 104.

(Transmitting Operation)

The transmitting operation is performed by the steps of: selecting the facsimile mode, reading image data from a document placed on the document placement table by means of document reader 102, supplying the read image data to CPU 300 made up of a microcomputer etc. shown in FIG. 3 where the image data is subjected to various kinds of image processes, and outputting the thus obtained image data to the FAX communicator (FAX communicator 160 in FIG. 3).

As shown in FIG. 3, FAX communicator 160 of the transmission side image forming apparatus 100 connects the selected transmitter side line to the designated destination, converts the image data into communication data conforming to the facsimile communication standard and transmits the communication data to the receiver side facsimile machine (e.g., image forming apparatus 100 having a facsimile function).

(Communication Operation)

When connection of the line is established, FAX communicator 160 of image forming apparatus 100 on the receiver side detects a communication request signal from FAX communicator 160 of image forming apparatus 100 on the transmitter side and sends a response signal. Then, for example, FAX communicators 160 on both the transmitter and receiver sides exchange facsimile performance information of their own with each other and determine the communication rate and coding and code correction scheme of the image data within the available maximum capacity to set up a modem communication scheme. The data is transmitted using an image signal scheme conforming to this communication scheme, from FAX communicator 160 of image forming apparatus 100 on the transmitter side to FAX communicator 160 of image forming apparatus 100 on the receiver side. When data transmission is ended, the line is cut off.

(Receiving Operation)

The FAX communicator 160 of image forming apparatus 100 on the receiver side converts the received data into image data and sends the data to image forming portion 104. Here, the received data may be converted into image data by image forming portion 104. Image forming portion 104 prints images of documents represented by the image data converted from the received data, onto recording paper, in the same manner as the above-described operation in copy mode.

Next, the control block configuration of image forming apparatus 100 will be described with reference to the drawings.

As shown in FIG. 3, image forming apparatus 100 includes: control unit 120 that allows the user to set copy mode and facsimile mode; a ROM 306 for storing programs etc.; a hard disk 302 serving as a non-volatile storage area that can hold programs, data and the like even if the power is cut off; and a RAM (Random Access Memory) 308 that offers a storing area when a program is executed.

Image forming apparatus 100 further includes: a bus 310 connected to image reader 102, image forming portion 104, FAX communicator 160, control unit 120, ROM 306, hard disk 302 and RAM 308; and CPU 300 that is connected to bus 310 to realize general functions as an image forming apparatus.

Hard disk 302 records (stores) files of image data of documents scanned by the image forming apparatus 100. Hard disk 302 also stores initial screen data for each operational mode. The files and data stored in hard disk 302 can also be recorded in ROM 306.

Stored in ROM 306 are programs, data and the like necessary for controlling the operation of image forming apparatus 100. As the data stored in ROM 306 with the programs, the initial screen data for each operational mode may be stored. CPU 300 controls image forming apparatus 100 in accordance with the programs and data stored in ROM 306 and performs control associated with each function of image forming apparatus 100.

As shown in FIG. 3, a public line for exchange of image data is connected to FAX communicator 160 of this image forming apparatus 100 while a network line is connected to a network interface 304. This network line may be connected to a computers etc. that use this image forming portion 100 as a network printer or may be connected via the internet to a computer etc. that is identified by a designated URL (Uniform Resource Locator). When connected to the Internet in this way, the image forming apparatus 100 can obtain the necessary information via the Internet.

RAM 308 offers a function as a working memory for temporarily recording the result of the operation and processing by CPU 300 and a function as a frame memory for recording image data.

Control of image reader 102, image forming portion 104, touch panel display 130 and display control portion 140 forming control unit 120, ROM 306, hard disk 302 and RAM 308 is performed by CPU 300 executing predetermined programs. Here, control unit 120 communicates with CPU 300 by way of an input/output interface.

Control unit 120 is given as a board-like panel that is tilted so as to allow the user ease of view. Control unit 120 includes touch panel display 130 in the left area and display control portion 140 (including indication lamp 142 and hardware buttons, namely, power key 144, energy-save key 146 and home key 148) in the right area on the top thereof. Touch panel display 130 and display control portion 140 are integrally provided in control unit 120.

As described above, this touch panel display 130 is formed of display panel 132 and touch panel 134 that is laid over display panel 132.

Touch panel display 130 displays on display panel 132 the home screen for selection of the operational mode of image forming apparatus 100, the current status of this image forming apparatus 100, the status of destination selection, job processing status and the like.

Displayed in the preview display region of display panel 132 are selection buttons as software keys. When the displayed area of a selection button is pushed by a finger, touch panel 134 detects the pushed position. Then, the position on which touch panel 134 is pressed is compared with the positions of selection buttons so as to perform selection of an operational mode of image forming apparatus 100, functional setting, operational instructions, and the like. In addition to this touch control (command input control based on the position of the user's pressing), this image forming apparatus 100 also supports the above-mentioned gesture control (command input control based on the trace of user's control motion).

Further, indication lamp 142 of display control portion 140 is made up of a LED (Light Emitting Diode) for instance and is controlled by CPU 300 so as to turn on/off (/flash on and off). When the user presses down power key 144 that is provided separately in addition to the main power switch, this image forming apparatus 100 comes out of standby mode (in which, for example, only fax reception is permitted with the main power turned on) to active mode so that the whole operational modes of this image forming apparatus 100 can be used. Indication lamp 142 comes on in link with this status. Further, when a predetermined period has elapsed without receiving any user input, or when the user presses energy-save key 146, this image forming apparatus 100 comes out of active mode into energy save mode so that only part of the operational modes of image forming apparatus 100 are operational. Indication lamp 142 flashes on and off in link with this status. Further, when the user presses energy-save key 146 in this energy save mode, the image forming apparatus 100 comes out of energy save mode into active mode. Home key 148 is a hardware key for retuning the display of touch panel display 130 into the initial condition (home screen). It is noted that the operations when power key 144, energy-save key 146 and home key 148 are pressed should not be limited to these.

The hardware keys on display control portion 140 (power key 144, energy-save key 146 and home key 148) may be embedded with a key lamp controlled by CPU 300 so as to turn on/off (/flash). For example, this key lamp may be a round type key ring-like lighting or center lighting. This key lamp turns on at the timing that the hardware key is permitted to use as a control device (at the timing that operation is performed when the hardware key is used).

Image forming apparatus 100 has the aforementioned two operational modes (copy mode and facsimile mode). Software buttons for function settings in each operational mode are displayed on touch panel display 130, and also the preview as the on-screen form of forming images, keys for destination setting and the like are displayed as necessary.

When the operational mode is different from that which the user wants, touch panel display 130 displays another screen. Even in such a case, in order for the user to easily find the information the user requests, touch panel display 130 is divided into multiple regions (which also are given in a size variable manner) so as to display necessary information in each region.

In particular, in this image forming apparatus 100, when one operational mode is selected on the home screen of touch panel display 130 provided as the main display control device, the initial screen of the operational mode is displayed.

In this initial screen, (1) the basic layout is formed of five areas, namely "system region", "function selecting region", "preview region", "action panel region" and "task trigger region", which are appropriately arranged, so that the user is able to easily perform input of settings from top left to bottom right (in the same manner as the user moves their gaze and fingers in the conventional machine which is not provided with a large scale touch panel display 130). Further, (2) the concept of the displays of the five regions is consistent in all operational modes, so that the user is able to operate without confusion when another operational mode is used.

The configuration of the basic layout will be described next.

The basic layout in touch panel display 130 will be described with reference to the drawings.

As shown in FIG. 4, the basic layout of touch panel display 130 is designed in the laterally long touch panel display 130 such that a system region 1000 is arranged at the topmost part, a preview region 3000 in the center of the screen, a function settings/confirmation region 2000 on the left side of preview region 3000, an action panel region 4000 (information display region) on the upper right part of preview region 3000, and a task trigger region (control key displayed region) 5000 on the lower right of preview region 3000. Here, the laterally long touch panel display 130 is formed of, for example, 1024 pixels wide×600 pixels high. Further, function settings/confirmation region 2000 will be written hereinbelow as function selecting region 2000.

It is noted that the number of regions in touch panel display 130 should not be limited to five. Also, the horizontal arrangement should not be limited so that the horizontal arrangement may be reversed right side left, for example, depending on the user's dominant hand. Further, the position of system region 1000 may be disposed at the lowermost part. Alternatively, the system region 1000 may be undisplayed depending on the status or settings.

System region 1000 displays the current status of this image forming apparatus 100, e.g., the title of the operational mode in control and the status and conditions of image forming apparatus 100. For example, displayed in system region 1000 are the name of operational mode, the cut-in key, the log-in user name, the job status in progress, the usage status of built-in memory, time and the like.

In function selecting region 2000, settings in each function, display switching, function selecting menu (icons, buttons, etc.) operated by user to confirm settings are variably displayed in a selected display style, i.e., in icon mode, regular mode or express mode. In icon mode, only icons for function setting are displayed in function selecting region 2000 so as to maximize the size of preview region 3000. In express mode, the display of function selecting region 2000 is enlarged so as to allow the user to set the function all at once though the size of preview region 3000 is minimized. In regular mode, preview region 3000 is sized between that in the icon mode and that in the express mode while in function selecting region 2000 the text of function titles is displayed together with functional setting icons.

These icon mode, regular mode and express mode are switched from one to another based on user control. That is, the size of preview region 3000 is modified and displayed in accordance with user control. In this way, since icons are able to give information to the user by using limited area, it is preferable that every function is given with an icon so as to be able to enlarge the display of preview region 3000.

This function selecting region 2000 includes at its bottom a group of select buttons 2010 for switching the display style in function selecting region 2000. Arranged in the group of select buttons 2010 are an icon mode entering button 2012 for displaying function selecting region 2000 in icon mode, a favorite button 2014 for displaying the functions registered as "favorites", a check button 2016 for displaying the functions whose settings have been modified, a list button 2018 for displaying a list of all the functions that can be designated in the selected operation mode, a regular mode entering button 2020 for displaying function selecting region 2000 in regular mode, and an express mode entering button 2022 for displaying function selecting region 2000 in express mode.

Here, when there are many pieces of information to be displayed in function selecting region 2000, the information is displayed in this function selecting region 2000, in a vertically movable manner. In this case, this group of select buttons 2010 is not moved but constantly displayed in the bottom-most portion of function selecting region 2000.

Preview region 3000 displays the image of the output pages of the (finished) document. The image is displayed using dummy data or scanned data, and the displayed image in preview region 3000 is revised every time the user changes the finish. There are two modes of displaying the finish in this preview region 3000: the display of the final preview with a dummy image in virtual mode before scanning and the display of the final preview with actual images in scan-in mode after scanning. The virtual mode further has two types, before setting documents and after setting documents.

At the bottom of this preview region 3000 there is a group of preview select buttons 3010 for changing the display style in preview region 3000. The group of preview select buttons 3010 includes a rotate-left button 3016 for rotating the image left 90 degrees and a rotate-right button 3018 for rotating the image right 90 degrees and a zoom bar 3020. Other than these, for example a change color button 3012 and preview control button 3014 are arranged.

With this, when rotate-left button 3016 is touched once, the preview rotates 90 degrees left. When the button is touched twice, the preview is rotated 180 degrees left (inverted upside down). Alternatively, when the image of the finished document displayed in the preview region is gesture-controlled (by rotating the document image 180 degrees counterclockwise with the fingertip), the preview is rotated 180 degrees left or inverted upside down.

When rotate-right button 3018 is touched once, the preview rotates 90 degrees right. When the button is touched twice, the preview is rotated 180 degrees right (inverted upside down). Alternatively, when the image of the finished document displayed in the preview region is gesture-controlled (by rotating the document image 180 degrees clockwise with the fingertip), the preview is rotated 180 degrees right or inverted upside down.

When the (+) button 3020A of zoom bar 3020 is touched, or when bar 3020C is gesture-controlled (by the "drag or slide" gesture) toward the (+) button 3020A, the preview image is enlarged. Alternatively, when the image of the finished document displayed in the preview region is gesture-controlled (on the document image by the "pinch out/pinch open" gesture with fingertips), the preview image is enlarged. Here, the "drag" gesture is an action of moving the finger. The "pinch out/pinch open" is an action of spreading the two fingertips apart.

When the (−) button 3020B of zoom bar 3020 is touched, or when bar 3020C is gesture-controlled (by "drag or slide"

gesture) toward the (−) button 3020B, the preview image is reduced. Alternatively, when the image of the finished document displayed in the preview region is gesture-controlled (on the document image by the "pinch in/pinch close" gesture with fingertips), the preview image is reduced. Here, the "pinch in/pinch close" is an action of bringing the two fingertips together.

When there are many pages of document images to be displayed in preview region 3000, touchable displayed page select buttons (page number input buttons, page up and down buttons, single page display button and multiple page display button, etc.) may be displayed. In this case, it is also possible to turn over or return the page of the document to be previewed by a sliding touch (flicking gesture) of the document image. Further, when the document image to be displayed in preview region 3000 is large, scroll bars that can be touched or gesture-controlled may be displayed. The flicking gesture is an action of the finger sweeping lightly.

Action panel region 4000 displays information such as hint, advice and suggestion for operation and control. Display in this action panel region 4000 is given such that when a particular function is selected by a certain user, the functions associated with the subject function may be displayed, another function as to the subject function may be displayed in a purpose-oriented manner, or the function that was selected in the past in combination with the subject function by the same user or a user of the group to which this user belongs may be displayed as a "recommended function".

Task trigger region 5000 displays trigger items that the user operates in order to actually cause the image forming apparatus 100 to operate after all the settings in the operational mode have been completed. An example is the start button (software button) for starting the operation. Here, since information on a lack of a consumable supply is also related to the unfeasibility of the task in the operational modes needing a printing process (other than fax transmission), this should be also displayed in this "task trigger region".

In this case, it is also preferable that the start button is displayed only when the start button can be pressed down. The condition in which the start button can be pressed down, means a state where all settings have been completed and none of consumable supplies (recording paper and toner) will run short in the case of an operational mode needing a printing operation or a state where all the transmission parameters including destination have been set in the case of a fax mode (transmission) operation as the operational mode needing no printing.

The layout of these five regions is not changed even if the operational mode is switched from one to another (in the initial screen of any operational mode). Further, each region may change in size, expanding or contracting in the horizontal (longitudinal) direction of the screen of touch panel display 130 as in the case where the display of function selecting region 2000 (and preview region 3000) is switched between icon mode, regular mode and express mode.

The layout of the five regions is designed in light of the user interfaces in conventional machines, by directing attention to user's path of gaze and control. This arrangement leads the user to perform settings by moving their gaze from top left to bottom right and moving their input action (fingers of the dominant hand) from top left to bottom right.

In this arrangement, for switching the operational mode from one to another, the user presses down home key 148 (FIG. 3) and selects another operational mode on the home screen. In this way, it is possible to change operational mode by way of the home screen.

(Initial Screen Display Operation in Copy Mode)

When copy mode is selected, the initial screen for copy mode is displayed on touch panel display 130 using copy mode initial screen data loaded from hard disk 302 (FIG. 3) or the like.

In this occasion, a copy mode initial screen 7100 is displayed for example, on touch panel display 130, as shown in FIG. 5. Copymode initial screen 7100 displays information using the five divided regions laid out as described above.

In system region 1000 (FIG. 4) of copy mode initial screen 7100, areas 1102, 1104, 1106, 1108, 1110, 1112, 1114 and 1116 are laid out as shown in FIG. 5.

Area 1102 denotes the operational mode being selected (copy mode in this case). Displayed in area 1102 is the name and/or icon of the operational mode.

It is also preferred that a pulldown menu showing operational modes is displayed so as to allow for switching of operational mode when this area 1102 is touch-controlled, tapped or double-tapped (the same in other operational modes).

Area 1104 displays sub information entailing the selected operational mode.

In area 1104 a cut-in key (software button) is displayed as sub information. When this cut-in key is touched, tapped or double-tapped, a cut-in process can be actuated in copy mode.

Area 1106 displays the log-in user name.

In area 1108 a log-out button (software button) is displayed.

Area 1110 displays the status of the job in progress.

Area 1112 displays buttons (software buttons) related to job status.

That is, area 1112 displays the status of the job in progress with an icon. This job status is touch-controlled, tapped or double-tapped, the job status information is displayed in detail. It is further preferable that a button for suspending the selected job and the like is displayed in area 1112.

Area 1114 displays the communication status and area 1116 displays the current time.

Displayed in function selecting region 2000 (FIG. 4) on copy mode initial screen 7100 are a function selecting menu 2100 that allows the user to select in copy mode and a group of select buttons 2010 described above. In the screen shown in FIG. 5, the function select menu is displayed in regular mode.

As shown in FIG. 5, the function select menu displayed in regular mode is composed of a group of icons 2100 and a group of texts 2120. As the function select menu displayed in function selecting region 2000, texts 2122, 2124, 2126, 2128, 2130, 2132, 2134 and 2136 are displayed.

Text 2122 shows an icon 2102 for setting the number of copies and its set content.

Text 2124 shows an icon 2104 for setting color mode and its set content.

Text 2126 shows an icon 2106 for setting copy density and its set content.

Text 2128 shows an icon 2108 for setting copy magnification and its set content.

Text 2130 shows an icon 2110 for setting the document type and its set content.

Text 2132 shows an icon 2112 for setting the paper type and its set content.

Text 2134 shows an icon 2114 for image edition and its set content.

Text 2136 shows an icon 2116 for layout edition and its set content.

Here, it should be noted that a greater number of items can be also displayed in the function setting menu, in a vertically scrolling manner with the position of select buttons 2010 fixed. In this case, the displayed items inclusive of hidden items above and below, can be changed from one to another by any of touch control (scroll control) and gesture control (flick control in the vertical direction).

Here, the image edition is edition for one page document, and includes, as a lower-layered menu, frame deletion, printing menu, watermark, user stamp and the like. The layout edition is edition for multiple pages of documents, and includes, as a lower-layered menu, page integration, binding margins, page change, centering and the like. Subordinates menus under these will be displayed on touch panel display 130 by touching, taping or double-tapping icons 2102 to 2116 or texts 2112 to 2136.

Arranged in preview region 3000 (FIG. 4) on copy mode initial screen 7100 are a document output (finish) image 3100 and a group of preview select buttons 3010 stated above. In this arrangement, dummy data or scanned data is used to display image 3100, and the image 3100 is changed and displayed in preview region 3000 every time the function setting menu in function selecting region 2000 is changed (the preview display is changed).

Displayed in action panel region 4000 (FIG. 4) on copy mode initial screen 7100 is information such as hint, advice and suggestion for copying operation. Here, recommended functions in the copy mode that the user selects are displayed as shown in FIG. 5. In this case, action panel region 4000 includes an area 4100 for displaying the content of displayed information and areas 4102 to 4106 that serve in themselves as software buttons and display text indicating recommended functions.

When area 4102 is touch-controlled, tapped or double-tapped, a pulldown menu of further detailed information for energy-saving in copying is displayed. In this case, for example a software button for entering the function setting screen for duplex copying is displayed with text "Duplex printing will save paper", a software button for entering the function setting screen for page integration with text "Printing multiple documents integrally will save paper", and a software button for entering the function setting screen for saddle stitch binding with text "Printing can be done so as to bind the paper as a booklet".

Displayed in task trigger region 5000 (FIG. 4) on copy mode initial screen 7100 is a group of command buttons 5100. These command buttons 5100 include a scan-in key (software button) 5102, a clear-all key (software button) 5104, a monochrome start key (software button) 5106 and a color start key (software button) 5108.

Scan-in key 5102 is a key for causing image forming apparatus 100 to scan a document to obtain image data.

Clear-all key 5104 is a key for clearing the set functions.

Monochrome start key 5106 is a key for causing image forming apparatus 100 to scan a document and perform monochrome copying.

Color start key 5108 is a key for causing image forming apparatus 100 to scan a document and perform color copying.

In this way, when the user inputs a request in copy mode initial screen 7100 displayed with information in five-divided regions, a copying process is effected in accordance with the request.

Next, description will be made on the switching operation of preview pages when preview region 3000 is enlarged with function selecting region 2000 displayed in icon mode.

When the user flicks left the preview display screen in which a preview image 3118 is displayed as shown in FIG. 6, the input trace is analyzed. In this case, the gesture control by this user is analyzed as a request for turning over the page, and a revised preview image including another page that has not been displayed and corresponds to the direction of the flick is displayed.

It is also possible to change the pages in preview image representation by touching a page forward button 3118G, page fast forward button 3118H, page reverse button 3118E or page fast reverse button 3118D. It is also possible to change the pages in preview image representation by touching a direct pagination button 3118F to directly input the page number the user wants to jump.

In this way, when function selecting region 2000 (FIG. 4) is displayed in icon mode, preview region 3000 is enlarged so that it is possible to display the preview image so as to improve user' visual recognition and user controllability, as shown in FIG. 6. In particular, it is possible to scroll the preview display up to a preview image the user wants by touch control or gesture control, and display the desired preview image.

Here, designated at 3118A in FIG. 6 is a trash icon. When a selected page is dragged to this trash icon 3118A, the page can be deleted.

When a single page display icon 3118B is pressed down, the preview image with, for example three pages displayed, is changed to one page representation (in this case one page is displayed in a large scale). When a multiple page display icon 3118C is pressed down, the preview image with, for example, one page displayed, is changed to three page representation.

Next, the display modes of the display panel in image forming apparatus 100 will be described with reference to the drawings.

Figure 7:
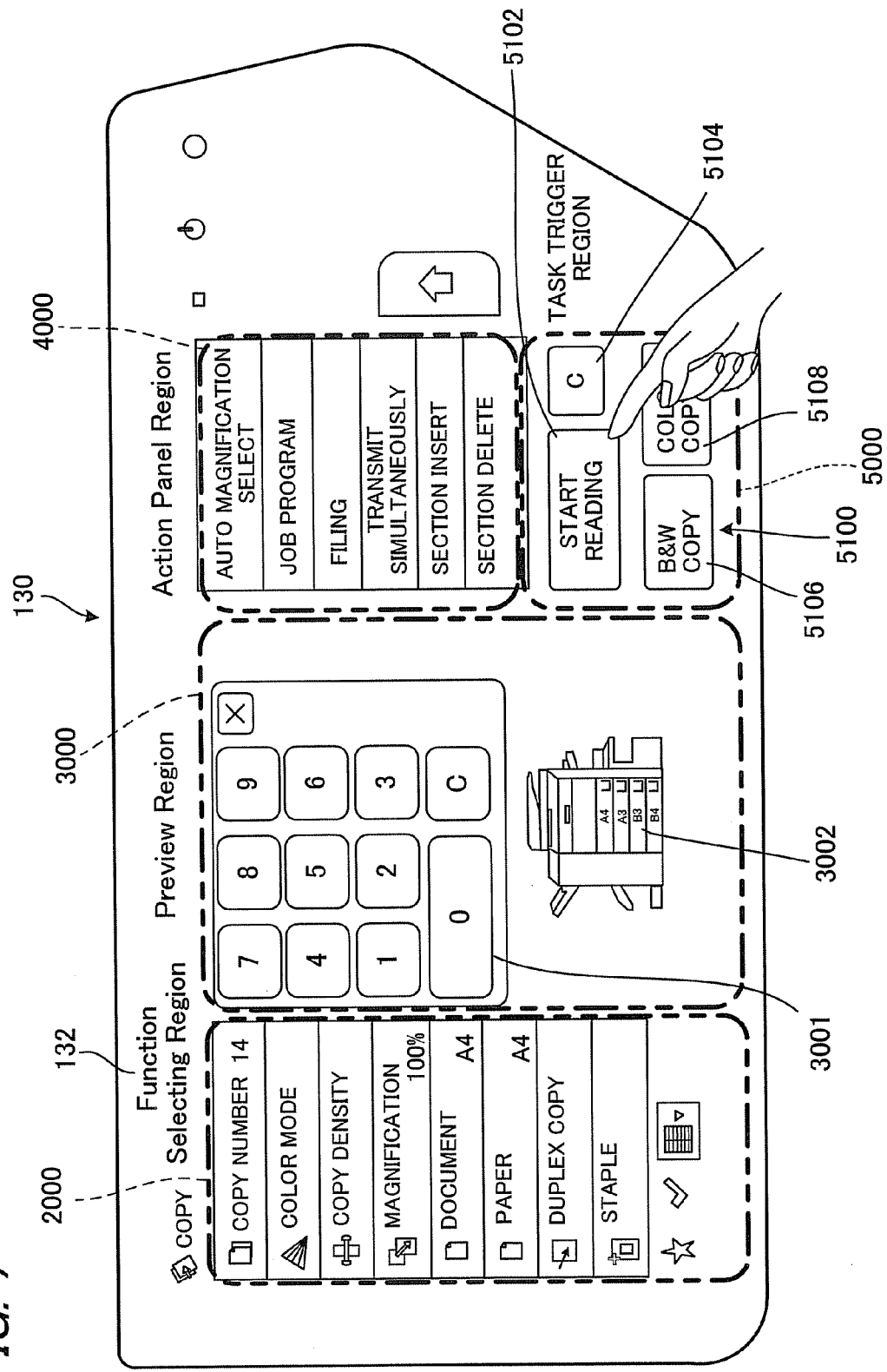
FIG. 7 is an illustrative view showing a display mode of a display panel of the touch panel display.

FIG. 7 is an illustrative view showing a display mode of a display panel of the touch panel display in the image forming apparatus.

As shown in FIG. 7, arranged on touch panel display 130 in image forming apparatus 100 are preview region 3000 in the center of the screen and function selecting region 2000 on the left side of preview region 3000. Action panel region 4000 is laid out on the upper right of preview region 3000, and task trigger region 5000 is arranged under the action panel region 4000.

Displayed in preview region 3000 in the initial screen are a virtual ten-key pad 3001 and a mimic display 3002 giving an image of the whole apparatus.

Task trigger region 5000 is constantly displayed in the lower right of preview region 3000 without reduction in size when preview region 3000 is enlarged.

Displayed in task trigger region 5000 is a group of command buttons 5100.

In the group of command buttons 5100, scan-in key 5102, clear-all key 5104, monochrome start key 5106 and color start key 5108 are laid out.

When this scan-in key 5102 is operated by scan-in instruction so as to scan documents and start acquisition of image data, the scan-in key may be replaced by an interrupt key for interrupting the operation of apparatus (interrupting scanning).

Next, the electric configuration related to the screen display of control unit 120 will be described with reference to the drawings.

Figure 8:
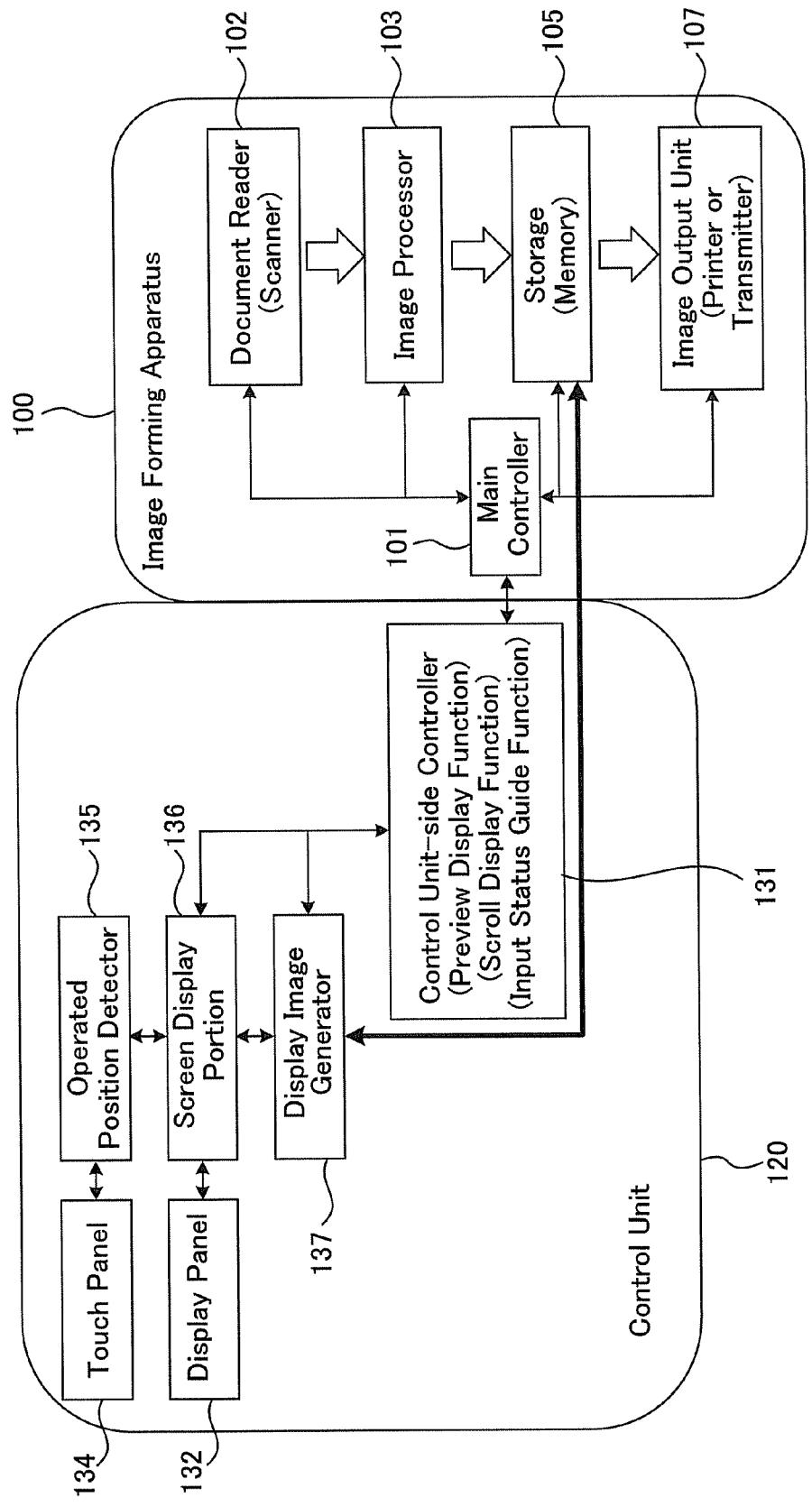
FIG. 8 is a block diagram showing an electric configuration of a control unit in the image forming apparatus.
Figure 9:
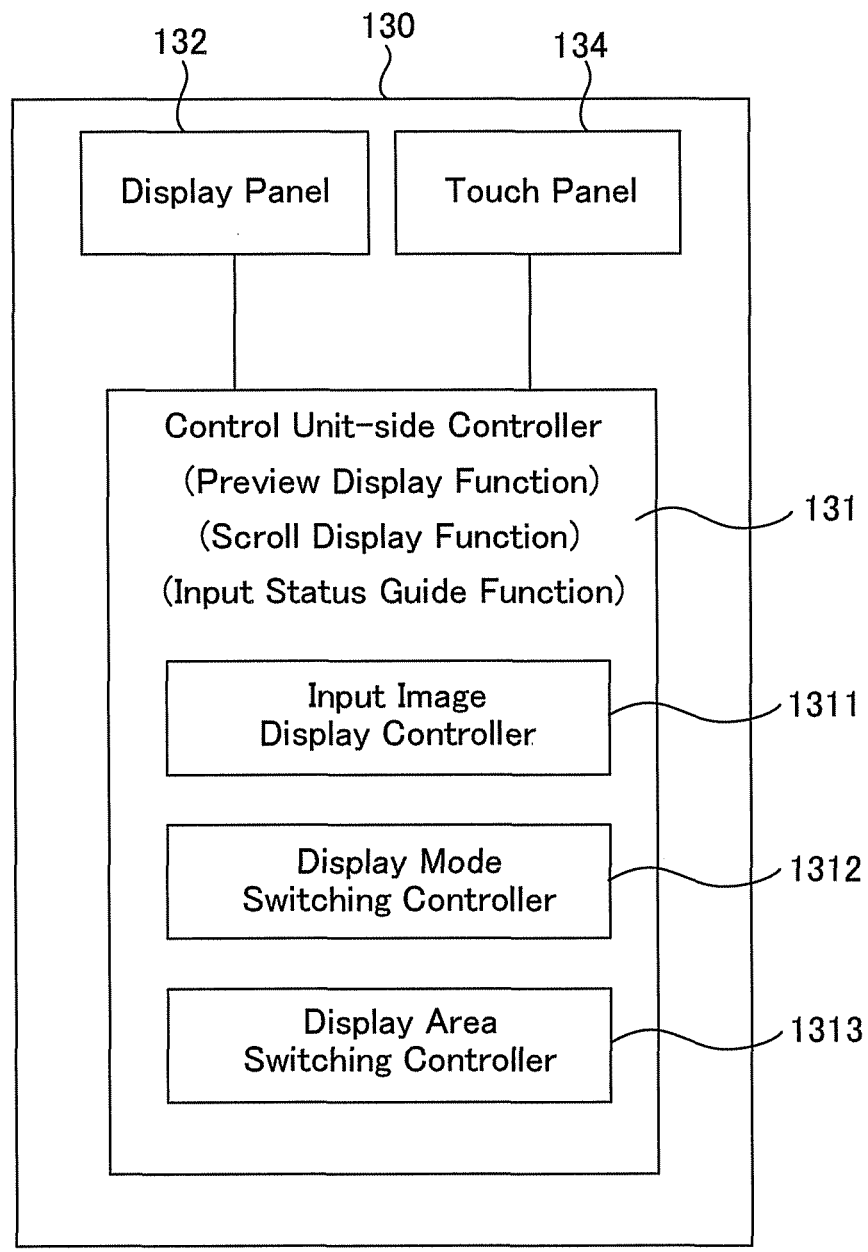
FIG. 9 is a block diagram showing a configuration of the touch panel display of the control unit.

FIG. 8 is a block diagram showing the electric configuration of control unit 120. FIG. 9 is a block diagram showing the configuration of touch panel display 130 of the control unit.

As shown in FIG. 8, control unit 120 includes, in addition to display panel 132 and touch panel 134, an operated position detector 135, a screen display portion 136, a display image generator 137 and control unit-side controller (display controller) 131 for controlling processing and operation in control unit 120.

Image forming apparatus 100 includes document reader 102 for capturing image data, an image processor 103, a storage 105 for storing image data input through document reader 102 and an image output unit 107 such as a printer, transmitter or the like for outputting images, all being operated and controlled by a main controller 101.

Operated position detector 135 detects the operated position on touch panel 134.

Screen display portion 136 displays an image formed by display image generator 137 on display panel 132.

Display image generator 137 prepares a predetermined image based on image data input to the main body of image forming apparatus 100, following instructions from control unit-side controller 131.

Control unit-side controller 131 is connected to main controller 101 of the main body of image forming apparatus 100 and functions as a controller in touch panel display 130.

Now, control unit-side controller 131 will be described in detail.

As shown in FIG. 9, control unit-side controller 131 includes a preview display function for displaying multiple pages of document images in a preview representation on display panel 132, a motion display function of displaying the preview images of multiple page document images while moving them, and an input status guiding function for displaying the input status of image data input through document reader 102 on display panel 132 to guide the user.

Control unit-side controller 131 further includes an input image display controller 1311 and a display mode switching controller 1312 and a display area switching controller 1313.

Input image display controller 1311 has the function that, when image data is input from document reader 102 (FIG. 8), sequentially displays display images generated by display image generator 137, in preview region 3000 in their input order during input of image data and displays the latest display image among the display images generated based on the image data, preferentially in preview region 3000.

Input image display controller 1311 has the function that displays a preceding one of the display images generated based on the input image data from document reader 102 first in preview region 3000 and erases the precedently generated display image from preview region 3000, then displays the display image generated based on the latest image data in preview region 3000, preferentially.

Input image display controller 1311 further has the function that displays a preceding one of the display images generated based on the image data input from document reader 102 in preview region 3000 and then displays the display image generated based on the latest image data in preview region 3000 when starting to erase the precedently generated display image. Specifically, when erasing the precedently generated display image from preview region 3000, input image display controller 1311 can erase the display image in a gradual manner.

Examples of mode in which the display image is gradually erased from preview region 3000, may include a mode in which the display image is gradually reduced from a large size to a small size and then erased (the first erasing mode), a mode in which the display image is gradually reduced in image density from normal to thin and erased (the second erasing mode), a mode in which the display image is gradually reduced in clearness from normal to blurred and erased (the third erasing mode) and a mode in which the displayed area of the display image is gradually reduced from totally displayed to less displayed (the fourth erasing mode). It is also possible to provide a combined erasing mode by selecting two or three modes from the first to fourth erasing modes, or by using all the modes.

Further, input image display controller 1311 has the function that, when all the display images generated based on the input image data from document reader 102 were displayed once in preview region 3000, displays the display image that was generated first among the display images generated based on the input image data from document reader 102, i.e., the display image of the front page of the scanned documents, in preview region 3000.

Display mode switching controller 1312 has the function that, when display of all the display images generated based on the input image data from document reader 102, in preview region 3000, has been completed, switches the display from the first display style in which the display images are displayed one by one in a large-scaled preview region 3000 on the display screen of display panel 132 to the second display style in which multiple display images are displayed in the order of input from document reader 102.

Display area switching controller 1313 has the function of enlarging preview region 3000 on the display screen of display panel 132.

Display area switching controller 1313 has the function of enlarging the preview area without reducing the size of function selecting region 2000 when preview region 3000 is enlarged on the display screen of display panel 132 and the function of enlarging the preview area without reducing the size of task trigger region 5000.

Display area switching controller 1313 further includes the function of enlarging preview region 3000 on the display screen of display panel 132 by reducing the area of action panel region 4000 in a re-displayable manner when the whole display process of the display images generated based on the image data input from document reader 102 is completed.

Next, preview representation of document images to be displayed on touch panel display 130 at the time of document reading will be described using a flow chart.

Figure 10:
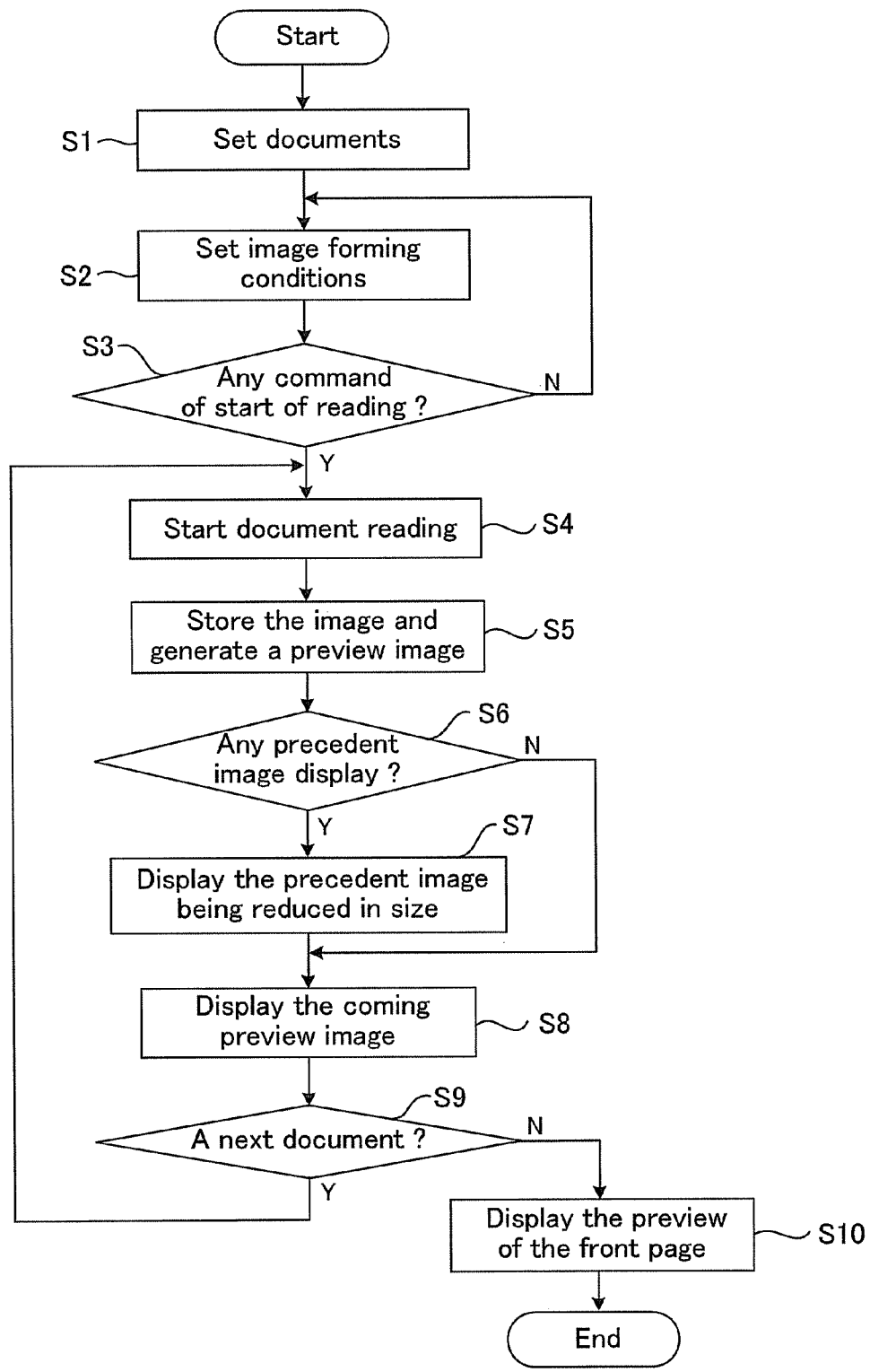
FIG. 10 is a flow chart showing the sequential steps of preview display of document images displayed on the touch panel display.

FIG. 10 is a flow chart showing the sequential steps of preview display of document images displayed on the touch panel display of the image forming apparatus according to the present embodiment.

In image forming apparatus 100, the preview representation of document images displayed on display panel 132 of touch panel display 130 is performed based on the operational flow shown in FIG. 10.

To begin with, when documents are scanned by document reader 102 in image forming apparatus 100, documents are set in document reader 102 (Step S1) and conditions for image forming are set up on touch panel display 130 (Step S2), as shown in FIG. 10.

Then, when condition setup for image forming is ended, it is determined whether a command of starting document reading is given (Step S3).

At Step S3, when it is determined that a command of starting document reading has been given, document reading by document reader 102 begins (Step S4).

On the other hand, when it is determined that no command of starting document reading has been given at Step S3, the control returns to Step S2, where condition setup for image forming is performed once again.

When document reading is performed at Step S4, the image data of a scanned document is recorded onto storage 105, and based on the recorded image data, image generator 137 generates a display image to be given in preview representation (Step S5).

Then, it is checked whether there is a previous display image (precedent display image) in preview region 3000 (Step S6).

It is determined at Step S6 that there is a previous display image in preview region 3000, the precedently given display image is gradually reduced in size (Step S7) and the coming display image (the latest display image) is displayed in preview region 3000 (Step S8). Thereby, the user is able to easily confirm the process of image data being captured into the apparatus when image data is input to the image forming apparatus. Further, it becomes more easy to confirm the latest input data. Further, the user can readily recognize that image data is continuously captured and the latest input data is displayed.

On the other hand, when it is determined at Step S6 that there is no previous display image (precedent display image) in preview region 3000, the coming display image (the latest display image) is directly presented in preview region 3000 (Step S8).

Then, it is checked whether there is any document to be scanned next (Step S9).

When it is determined at Step S9 that there is a document to be scanned next, the control returns to Step S4, where next document reading is performed.

On the other hand, when it is determined at Step S9 that there is no document to be scanned next, the display image of the front page, which was displayed before, is displayed in preview region 3000 (Step S10), and document reading by document reader 102 is ended. This display makes it possible for the user to recognize that all the image data input has been completed.

In the present embodiment, the display mode of the display image in preview region 3000 at Steps S6 and S7 is devised to make the latest, newly displayed page image distinct. For example, the display image (precedent display image) may be gradually reduced from a large size (the normally displayed size) to a small size and then erased (the first erasing mode); the display image may be gradually reduced in image density from normal to thin and erased (the second erasing mode); the display image may be gradually reduced in clearness from normal to blurred and erased (the third erasing mode); or the displayed area of the display image may be gradually reduced from totally displayed to less displayed (the fourth erasing mode). Further, it is also possible to provide a combined erasing mode by selecting two or three modes from the first to fourth erasing modes, or using all the modes. Since any of the above erasing modes prevents the image being displayed from being erased all at once so as to imply the coming of the next image, the user can readily confirm the input status without feeling anxiety about how the image that had been displayed was handled and other worries.

Further in the present embodiment, the preview display of the front page at Step S10 can be switched by enlarging preview region 3000 on display panel 132 by display mode switching controller 1312, from the first display mode in which a single display image is given, to the second display mode in which multiple display images are displayed from the front page in the input order by document reader 102. As a result, it is possible to confirm not a single display image but a multiple number of display images of image data input to the image forming apparatus, at the same time, hence the user can readily grasp the sequential relationship between images.

Further in the present embodiment, the display area of preview region 3000 on display panel 132 can be changed by display area switching controller 1313, by enlarging preview region 3000 while reducing function selecting region 2000 (FIGS. 4 and 7) in a re-displayable manner, by enlarging preview region 3000 while displaying function selecting region 2000 without contraction, or by displaying task trigger region 5000 (FIGS. 4 and 7) without contraction when enlarging preview region 3000. Keeping the display of function selecting region 2000 or task trigger region 5000 without reduction enables the user to make control promptly when the user wants to change settings or give any other control directions, hence the apparatus is improved in user operativity.

Referring next to the drawings, the preview display given to perform display guidance of the document reading status made by document reader 102 on touch panel display 130, in image forming apparatus, will be described.

FIGS. 11 to 20 are illustrative views showing display screen of the touch panel display at the time of document reading.

Figure 11:
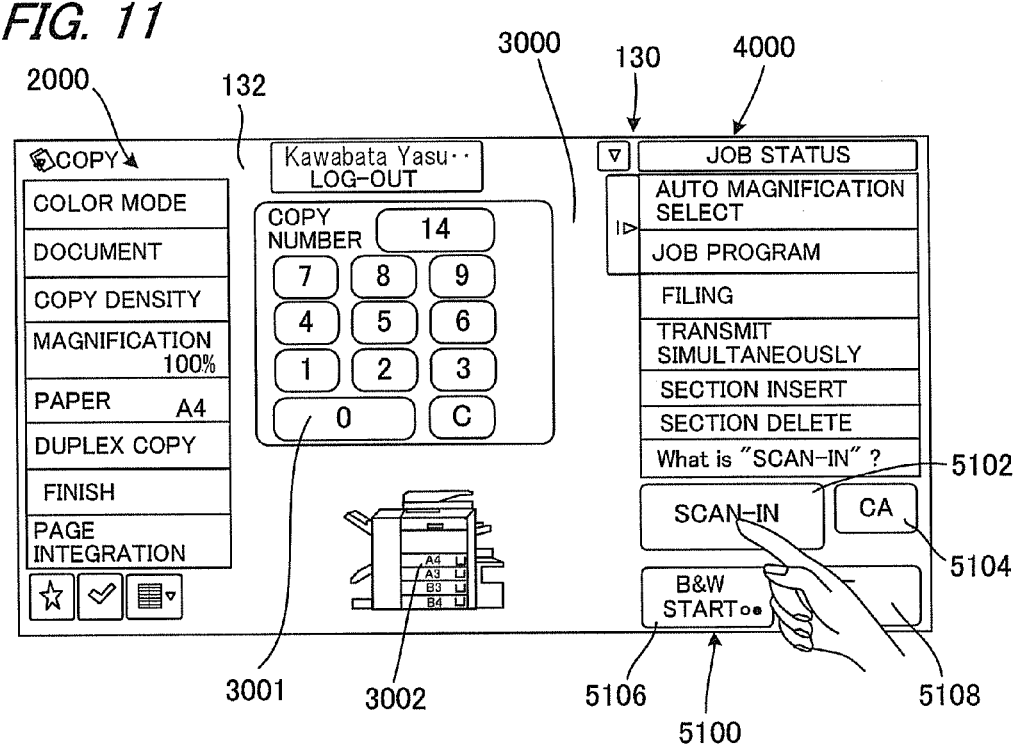
FIG. 11 is an illustrative view showing a display screen of the touch panel display at the time of document reading.
Figure 12:
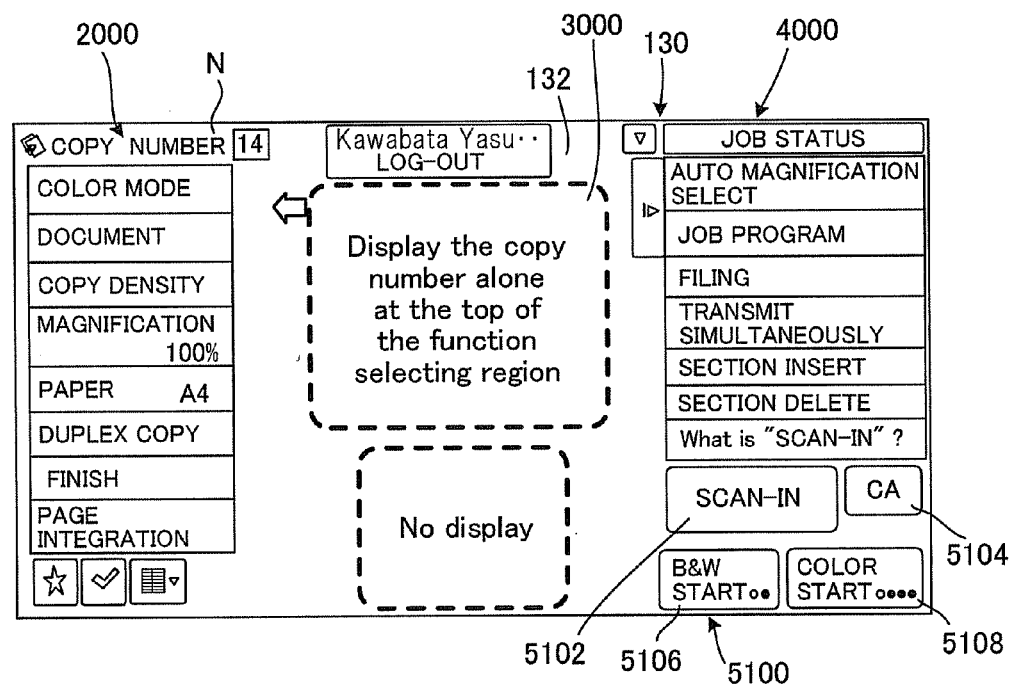
FIG. 12 is an illustrative view showing a displayed state in the preview region on the touch panel display at the start of document reading.
Figure 13:
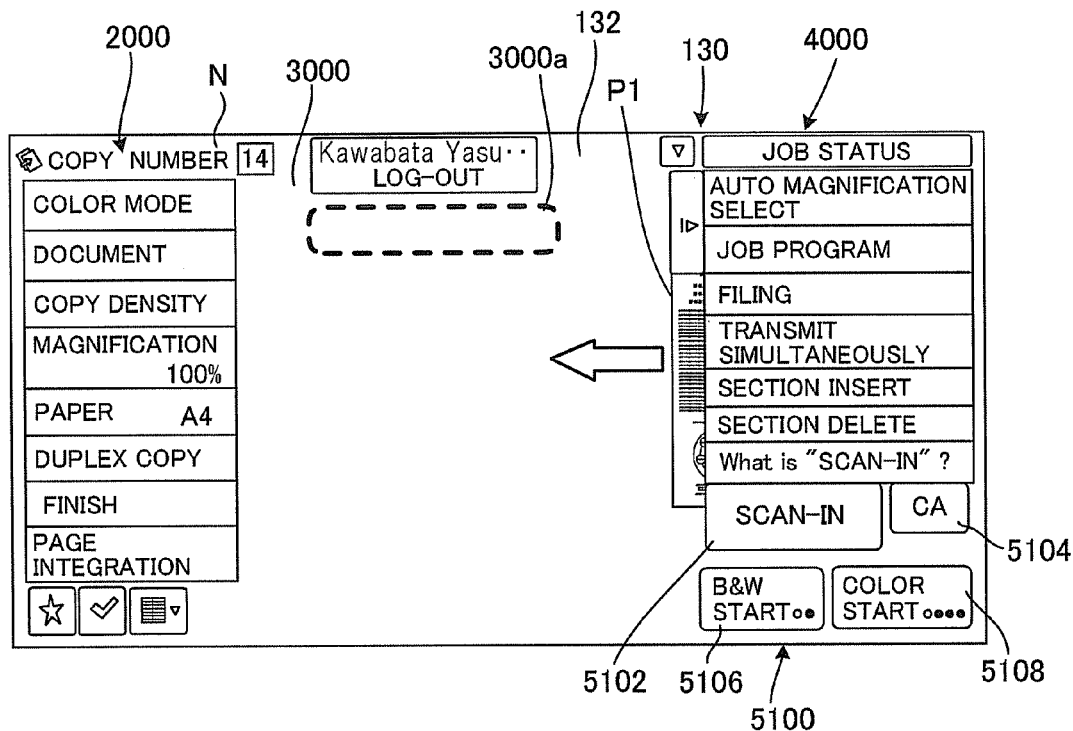
FIG. 13 is an illustrative view showing a displayed state of the first sheet image in the preview region when the first document starts to be scanned by the image reader of the image forming apparatus.

In image forming apparatus 100, when documents to be copied are read by document reader 102, the user selects the copy mode in the home screen displayed on touch panel display 130 and touches scan-in key 5102 as shown in FIG. 11 to start document reading.

In this case, A4-sized documents are set in long-edge-feed orientation, for example.

When document reading is directed by scan-in key 5102, virtual ten key 3001 and mimic display 3002 for giving the image of the whole apparatus are erased from the display that had been given before document reading direction in FIG. 11 so that blank display area of preview region 3000 is enlarged.

While virtual ten key 3001 is eliminated from preview region 3000, the copy number N alone is displayed in a reduced size near the upper area of function selecting region 2000.

Function selecting region 2000, action panel region 4000 and task trigger region 5000 are still displayed after the document reading direction.

When documents are scanned by document reader 102, the display image reduced in size is generated by display image generator 137, from the image data of the scanned first sheet document, and the first sheet image 21 appears from the left side edge of action panel region 4000 and is displayed moving leftwards to the approximate center of preview region 3000.

At this timing, a comment such as "scanning in process" or the like may be displayed near an upper area 3000a of preview region 3000.

Further, when the first sheet image 21 appears in preview region 3000, the image may be displayed so as to appear from behind action panel region 4000. At this time, action panel region 4000 may be made see-through to such an extent that the existence of the first sheet image 21 can be known over action panel region 4000.

Figure 14:
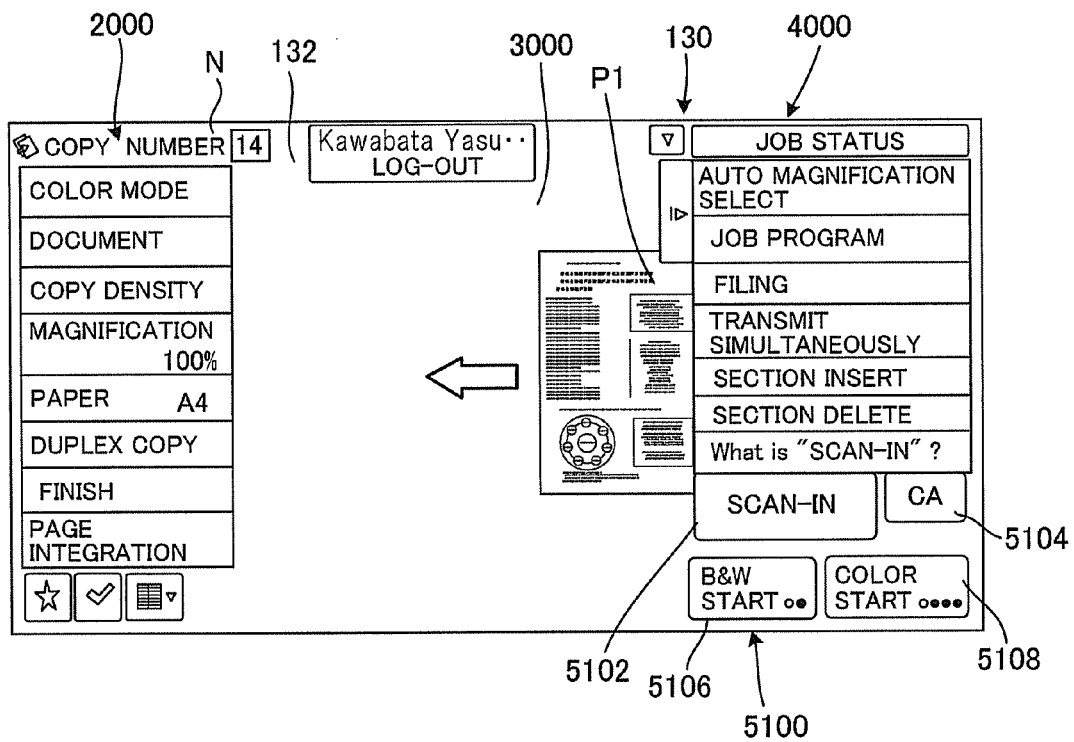
FIG. 14 is an illustrative view showing a displayed state of the first sheet image in the preview region when the first document is being scanned by the image reader.
Figure 15:
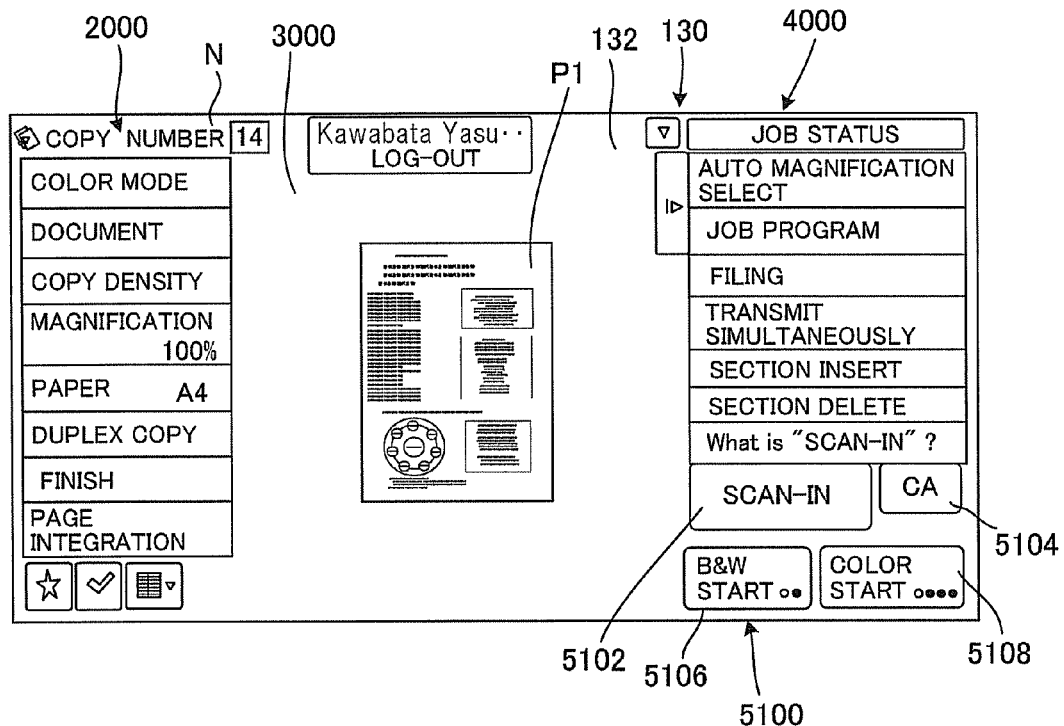
FIG. 15 is an illustrative view showing a displayed state of the first sheet image in the preview region when scanning of the first document has been completed by the image reader.

As shown in FIG. 14, first sheet image 21 as is moves leftwards during scanning by document reader 102. When the scanning of the document is completed, the image is stopped and displayed in the approximate center of preview region 3000, as shown in FIG. 15.

Figure 16:
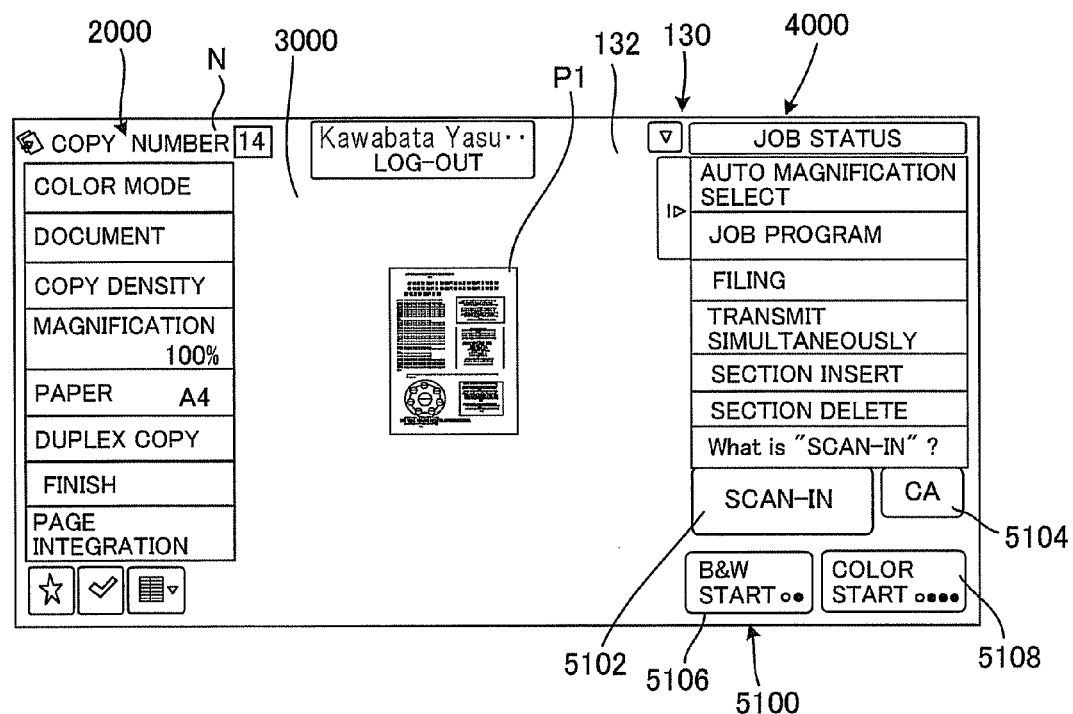
FIG. 16 is an illustrative view showing a state in which the first image displayed in the preview region is gradually erased.
Figure 17:
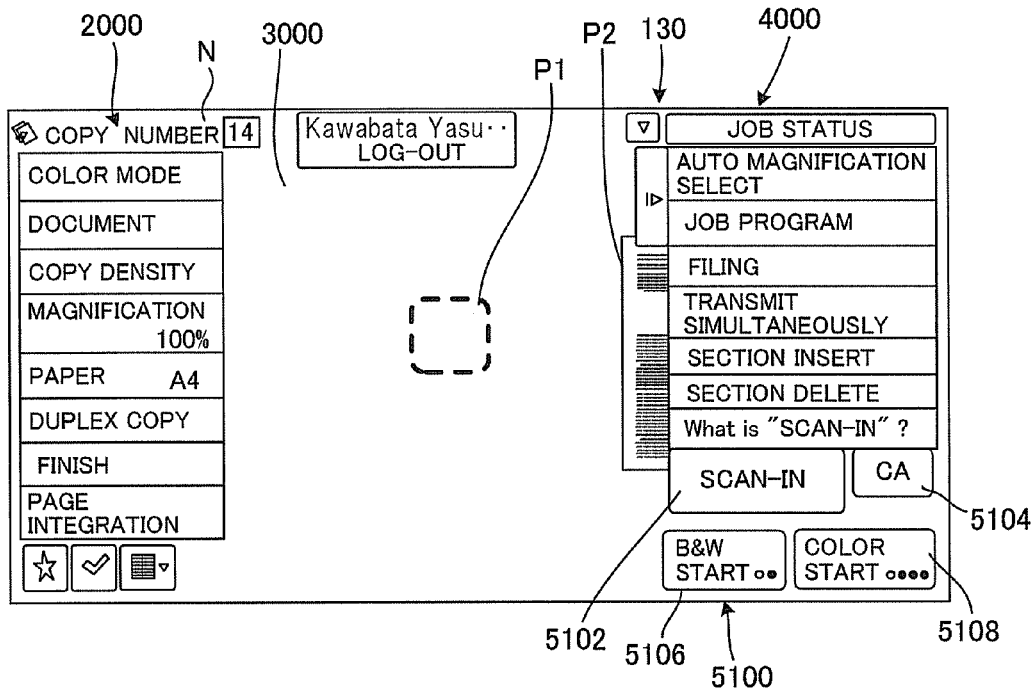
FIG. 17 is an illustrative view showing a displayed state of the second sheet image in the preview region when the second document starts to be scanned by the image reader.

Next, when scanning of the second document is started, the first sheet image 21 is gradually reduced in size as shown in FIG. 16, faded out and then erased completely, That is, in the process of scanning the second document, the second sheet image 22 appears in preview region 3000 from the left side edge of action panel region 4000 while the first sheet image 21 is becoming smaller and going out, as shown in FIG. 17. Then, the first sheet image 21 has gone out completely, the second sheet image 22 is moved leftwards to the approximate center of preview region 3000 and displayed. Then, the second sheet image 22 is stopped and displayed in the approximate center of preview region 3000.

In the above way, display and erasure of the scanned document display images in preview region 3000 are repeated until all the documents to be scanned are ended.

Figure 18:
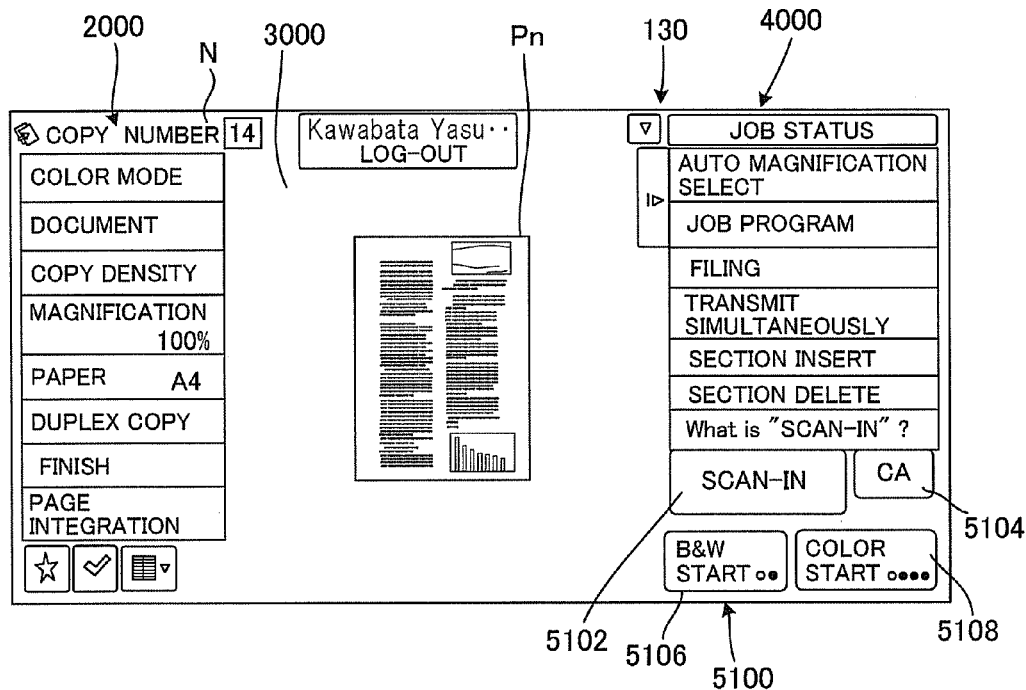
FIG. 18 is an illustrative view showing a displayed state of the final document image in the preview region when scanning of the final document has been completed by the image reader.
Figure 19:
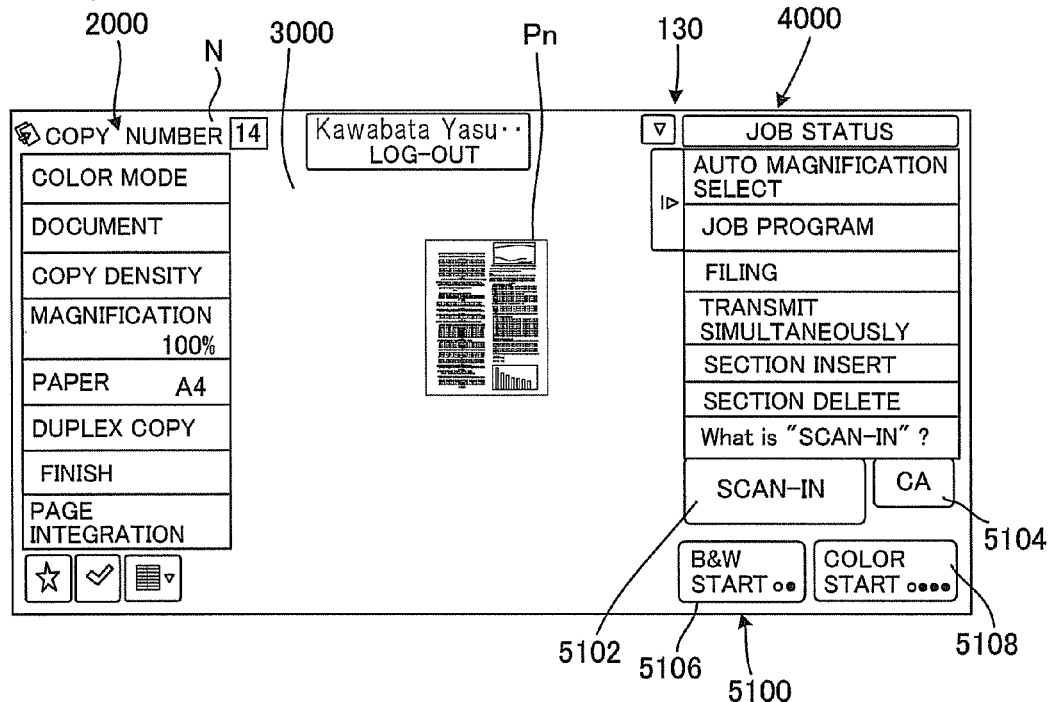
FIG. 19 is an illustrative view showing a displayed state in which the final document image displayed in the preview region is gradually erased after scanning of the final document by the document reader has been completed.

When scanning of the final document is completed, the final document image Pn is displayed in the approximate center of preview region 3000 as shown in FIG. 18, then the image is gradually made smaller, faded out and eliminated, as shown in FIG. 19.

Figure 20:
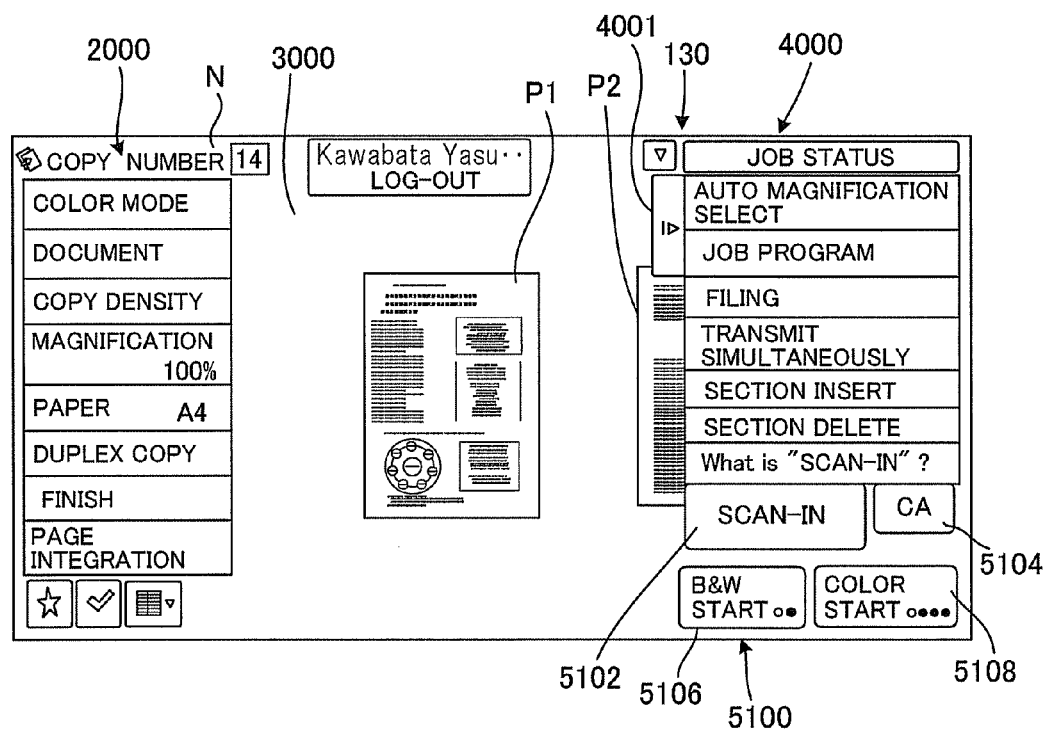
FIG. 20 is an illustrative view showing a displayed state of the touch panel display after all the documents have been pre-scanned by scan-in in the image forming apparatus; and, FIG. 21 is an illustrative view showing a state in which multiple display images are given in preview representation with the action panel region hidden in the image forming apparatus.

Then, when pre-scanning of all the documents by scan-in is completed, the display image generated first among the display images that were generated based on the image data input from document reader 102, i.e., the first sheet image P1 (the front page display image) of the scanned documents is displayed in the approximate center of preview region 3000 while part of the following, second sheet image P2 appearing in preview region 3000 from the left side edge of action panel region 4000 is displayed, as shown in FIG. 20.

Figure 21:
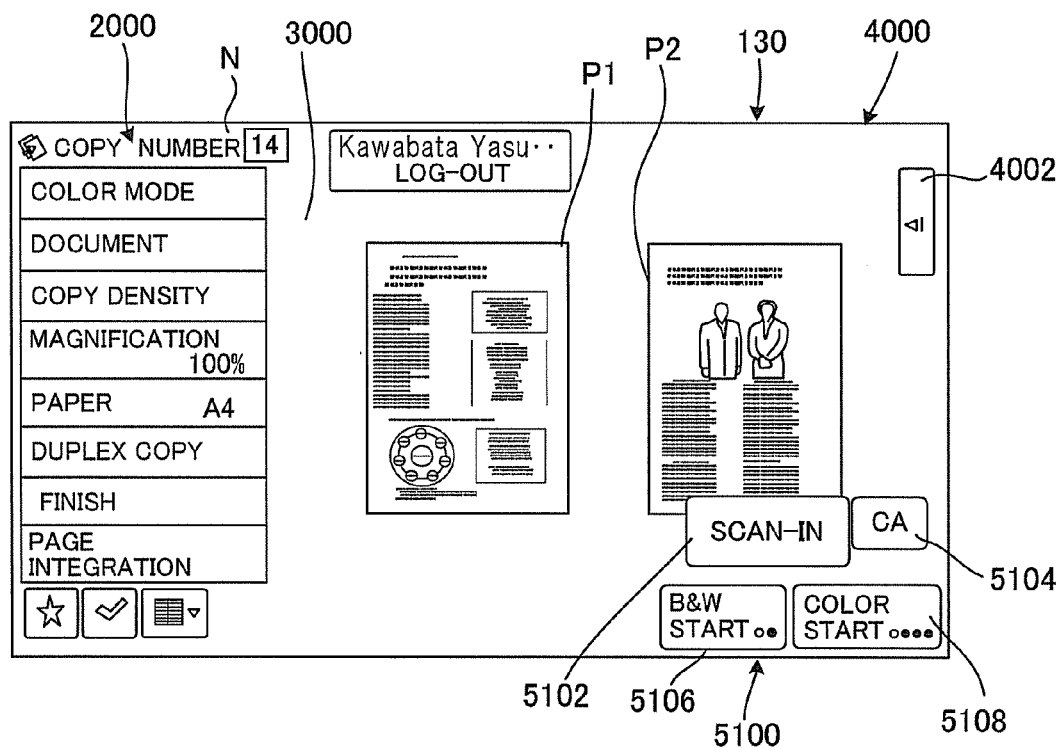

Here in this case, the display of action panel region 4000 may be hidden into the right side of the display screen of display panel 132 as shown in FIG. 21. In this case, the display mode is changed such that a pull-in button 4001 formed along the left edge of action panel region 4000 is replaced by a pull-out button 4002 that is displayed near the hidden display area. Pull-in button 4001 is a button which the user touches to cause action panel region 4000 to be hidden. Pull-out button 4002 is a button which the user touches to cause the hidden action panel region 4000 to appear once again on the screen.

Thus, by hiding action panel region 4000 in the above way it is possible to enlarge preview region 3000 and give a plurality of display images in preview representation. Further, since the display screen on display panel 132 changes from the display state during scanning, it is possible to clearly indicate the end of document reading to the user.

Moreover, since action panel region 4000 is configured to be re-displayable, it is possible to promptly display action panel region 4000 when the user needs control in relation to hint, advice and suggestion for operation of the image forming apparatus, whereby improved user operativity can be achieved.

As described heretofore, image forming apparatus 100 includes: as the components of control unit-side controller 131 of touch panel display 130 of control unit 120, input image display controller 1311, display mode switching controller 1312 and display area switching controller 1313. When image data is input to image forming apparatus 100, a display image is displayed in preview region 3000 every time each document is scanned by document reader 102, and the precedent display image is erased when a new document is scanned so that the latest display image is displayed. Accordingly, it is possible to present the display image based on the latest input data in preview area, hence it is possible for the user to readily confirm the status (progress) of document reading by document reader 102.

Further, if display panel 132 with high definition is used, the user can readily grasp the status (progress) of document reading in detail as displayed image becomes clear, so that it is possible to improve the operativity of the touch panel display.

Moreover, since input image display controller 1311 erases the display image by gradually reducing the display image while gradually making the image density thinner when the precedently generated display image is erased from preview region 3000, the user can readily view a new display image appearing on the display as document reading is continuously done.

Further, since input image display controller 1311 displays the first sheet image P1 of the scanned documents in the approximate center of preview region 3000 when scanning of the final document has been completed and displays part of the following, second sheet image P2 so as to appear in preview region 3000 from the left side edge of action panel region 4000, it is possible to clearly show the user the end of document reading, by changing the displayed state in preview region 3000 from the display state during scanning.

The above embodiment was described taking examples in which control unit 120 is applied to image forming apparatus 100 shown in FIG. 1. However, as long as it is an image forming apparatus that includes a control unit capable of presenting document images in preview representation on the display panel or the like before printing, the invention can be developed to any other image forming apparatus and the like, not limited to the image forming apparatus and copier having the configuration described above.

Having described heretofore, the present invention is not limited to the above embodiment, various changes can be made within the scope of the appended claims. That is, it is apparent that various kinds of variations and modified examples will occur to those skilled in the art within the scope of the appended claims. That is, any embodied mode obtained by combination of technical means modified as appropriate without departing from the spirit and scope of the present invention should be included in the technical art of the present invention.

What is claimed is:

1. An image forming apparatus comprising:
   an input unit receiving input of image data;
   a storing unit storing the image data input to the input unit and,
   an image display control device, the image display control device, including:
      a display image generator generating a display image based on the image data stored in the storing unit;
      a display portion having a preview region for displaying the display image generated by the display image generator; and,
      a display controller for giving guidance on the input status of the image data input to the input unit, on the display portion, wherein
      when the image data is input to the input unit, the display controller provides the function of sequentially displaying the display images generated by the display image generator in the input order and displaying the latest display image among the display images based on the image data, preferentially in the preview region, during input of the image data, and
   the display controller has the function of
      displaying a precedent display image generated precedently among the display images in the preview region;
      gradually reducing the precedent display image in size at an approximate center of the preview region and then fading out the precedent display image, when next image data is inputted;
      making a next display image appear from a side edge of the preview region during the reducing and fading out, the next display image being generated based on the next image data; and
      gradually making the next display image move toward the approximate center of the preview region during the reducing and the fading out.

2. The image forming apparatus according to claim 1, wherein the controller has the function that, when display of a plurality of the display images in the preview region has been completed, enlarges the preview region on the display portion to thereby switch a display mode from a first display mode in which the display images are displayed one by one to a second display mode in which a plurality of the display images are displayed in the order input to the input unit.

3. The image forming apparatus according to claim 2, wherein the display portion includes an information display region in which information including hint, advice and suggestion for operation of the image forming apparatus is displayed, and the display controller has the function that, when display of a plurality of the display images in the preview region has been completed, enlarges the preview region by reducing the information display region.

4. The image forming apparatus according to claim 2, wherein the
display portion includes a control portion that enables control of setting the image forming functions for the display images displayed in the preview region, and the display controller has the function of enlarging the preview region without reducing the control portion.

5. The image forming apparatus according to claim 2, wherein
the display portion includes a control key display region including control keys associated with the operation of the apparatus, and the display controller has the function of enlarging the preview region without reducing the control key display region.

* * * * *